United States Patent
Manzi et al.

(10) Patent No.: US 10,650,073 B1
(45) Date of Patent: May 12, 2020

(54) METHODS AND SYSTEMS FOR MEDIA ELEMENT OPTIMIZATION

(71) Applicant: FOUNDRYDC, LLC, Washington, DC (US)

(72) Inventors: James Manzi, Washington, DC (US); Ned Brody, Washington, DC (US)

(73) Assignee: FoundryDC, LLC, Washington, DC (US)

(*) Notice: Subject to any disclaimer, the term of this patent is extended or adjusted under 35 U.S.C. 154(b) by 41 days.

(21) Appl. No.: 16/037,632

(22) Filed: Jul. 17, 2018

Related U.S. Application Data

(60) Provisional application No. 62/533,426, filed on Jul. 17, 2017.

(51) Int. Cl.
| | | |
|---|---|---|
| G06F 17/00 | (2019.01) | |
| G06F 16/957 | (2019.01) | |
| H04L 29/08 | (2006.01) | |
| G06F 16/951 | (2019.01) | |

(52) U.S. Cl.
CPC ........ *G06F 16/9577* (2019.01); *G06F 16/951* (2019.01); *G06F 16/9574* (2019.01); *H04L 67/22* (2013.01)

(58) Field of Classification Search
CPC .................................................. G06F 16/958
See application file for complete search history.

(56) References Cited

U.S. PATENT DOCUMENTS

| | | | | |
|---|---|---|---|---|
| 9,021,390 B1* | 4/2015 | Pidhajecky | ........... | G06F 3/0481 463/42 |
| 2015/0067721 A1* | 3/2015 | Cadena Vedova | ........................... | H04N 21/41407 725/32 |
| 2019/0034976 A1* | 1/2019 | Hamedi | ............. | G06Q 30/0271 |

OTHER PUBLICATIONS

Liu et al., "Web Video Topic Discovery and Tracking via Bipartite Graph Reinforcement Model" WWW 2008, Apr. 21-25, 2008, Beijing, China, p. 1009-18. (Year: 2008).*

Mei et al., "VideoSense—Towards Effective Online Video Advertising" MM'07, Sep. 23-28, 2007, Augsburg, Bavaria, Germany, Copyright 2007 ACM, p. 1075-84. (Year: 2007).*

* cited by examiner

*Primary Examiner* — Amelia L Tapp
(74) *Attorney, Agent, or Firm* — Eric L. Sophir; Foley & Lardner LLP

(57) ABSTRACT

Disclosed herein are embodiments of systems, methods, and products comprises a server, which receives a request from a client's electronic device to optimize one or more media elements in an optimization zone of a web page. The server may receive a slideshow or a video and determine a candidate media dataset based on images from the slideshow or video. Alternatively, the server may receive an article and determine the candidate media dataset by searching images related with key words in the article. The server may modify the markup code of the web page and publish the media element within the candidate media dataset in the optimization zone. The server may further query the click-through (Continued)

rate (CTR) associated with each published media element. Based on the CTR results, the server update the rendering rate of each media element to produce the maximum CTR.

14 Claims, 11 Drawing Sheets

METHODS AND SYSTEMS FOR MEDIA ELEMENT OPTIMIZATION

CROSS-REFERENCE TO RELATED APPLICATIONS

This application claims priority to U.S. Provisional Patent Application Ser. No. 62/533,426, entitled "Methods and Systems for Media Element Optimization," filed Jul. 17, 2017, which is hereby incorporated by reference in its entirety.

TECHNICAL FIELD

This application relates generally to methods and systems for selecting a media element for an optimization zone of a web page to increase click-through rate of the optimization zone.

BACKGROUND

Click-through rate (CTR) is the ratio of users who click on a specific link compared to a number of total users who view a web page, an email, an advertisement, or any other electronically provided content. CTR is commonly used to measure the success of an online advertising campaign for a particular content associated with different websites as well as the effectiveness of email campaigns.

A web page may include links to articles, videos and other information. These links may be embedded in or presented as images displayed throughout a web page. An image is commonly used to serve as an embedded link, which may direct users to the provided content (e.g., an article, a web page, a video or other related information). For example, a web page may include multiple images (or other media elements such as a Graphical Interchange Format (GIF) or GIF lite, which are configured to arouse the viewers' curiosity. When a user clicks on an image, the host server (e.g., server hosting the website) may direct the user to the content related to the image (e.g., a different web page). Alternatively, a website may display a frame from a video (e.g., thumbnail) as a representation of the video. When a user clicks on the thumbnail, the host server displays the full video to the users (e.g., on the website). In existing and conventional methods, the media element (e.g., image, GIF, GIF lite or the thumbnail) is manually selected by an editor, which may be random or based on different biases and subjective preferences of the editor. For example, the editor may choose the first frame of a video to be displayed as thumbnail. The editor may also select an image to represent a news article or other web content.

These conventional methods and solutions have created several shortcomings and technical challenges that are specific to website design and website content optimization. The images selected by a user (even if relevant to the content) may not be the most suitable or desired by the website viewers. For example, what the editor has selected may not necessarily increase the CTR of the content. Furthermore, conventional methods do not provide a dynamic display of multiple media elements for the same content. For example, the selected image (by the editor) may not change once the website is published/rendered. Thus, a bad selection by the editor may have a negative impact on the marketing and advertising of the content provided on the website and may result in a decreased CTR. Furthermore, since the selected media element may not change after publication, the negative impacts may be further expanded and exasperated. As a result, the existing and conventional methods do not guarantee that the media element selected by the editor is the best option to optimize the CTR.

SUMMARY

For the aforementioned reasons, there is a need for a more accurate system and method that would allow a server to automatically optimize a web page zone by selecting the best media element to publish/render that may attract most users and produce most CTR. Disclosed herein are systems and methods for determining a set of media elements that may produce high CTR based on artificial intelligence algorithms, testing the CTR of the different media elements by dynamically changing the rendered media elements, and updating the rendered media elements in real time based on the CTR results of different media elements.

In one embodiment, a method comprises receiving, by a server, from an electronic client device, a request to optimize a media element within a web page using a candidate media dataset, wherein the request comprises an identification associated with the web page; upon displaying the web page on a graphical user interface on the electronic client device, receiving, by the server, from the electronic client device, a selection of an optimization zone within the web page, wherein the optimization zone comprises the media element, and wherein the optimization zone is a portion of the web page; receiving, by the server, a markup code of the web page from a web server hosting the web page; identifying, by the server, an initial media element within the optimization zone by determining a partial markup code corresponding to the optimization zone based on coordinates of the optimization zone, wherein the initial media element is configured to be displayed on each rendering of the web page; receiving, by the server, the candidate media dataset from the electronic client device; iteratively modifying, by the server, the markup code for each rendering of the web page to overlay each media element from the candidate media dataset on top of the initial media element within the optimization zone based on a dynamic rendering rate associated with each media element, wherein the dynamic rendering rate corresponds to a probability of each media element within the candidate media dataset being rendered on the web page, wherein the web page is rendered each time a user accesses the web page, wherein a click-through rate associated with each media element from the candidate media dataset is queried and received, by the server, from the web server upon each rendering of the web page, wherein the dynamic rendering rate of each media element is dynamically adjusted, by the server, based on the click-through rate of each corresponding media element within the candidate media dataset, and whereby a first media element has a higher dynamic rendering rate than a second media element when the first media element has a higher click-through rate than the second media element; and dynamically updating, by the server, the graphical user interface to display the click-through rate values associated with each media element within the candidate media dataset on the electronic client device.

In another embodiment, a method comprises receiving, by a server, from an electronic client device, a request to optimize an image within a web page using images from a video file, wherein the request comprises an identification associated with the web page; upon displaying the web page on a graphical user interface on the electronic client device, receiving, by the server, from the electronic client device, an indication of an optimization zone within the web page, wherein the optimization zone comprises the image, and wherein the optimization zone is a portion of the web page; receiving, by the server, markup code of the web page from a web server hosting the web page; identifying, by the server from the markup code, an initial media element displayed within the optimization zone, the initial media element being configured to be displayed on each rendering of the web page; receiving, by the server, the video file from the electronic client device, the video file comprising a set of video frames where each frame is an image; determining, by the server, a score for each image in the video file by analyzing characteristics of the images and comparing the characteristics with one or more criteria; generating, by the server, a candidate image dataset by selecting a number of images that satisfy a score threshold; iteratively modifying, by the server, the markup code for each rendering of the web page to overlay each image from the candidate image dataset on top of the initial media element within the optimization zone based on a dynamic rendering rate associated with each image, wherein the dynamic rendering rate corresponds to a probability of each image within the candidate image dataset being rendered on the web page each time the web page is rendered, wherein the web page is rendered each time a user accesses the web page, wherein a click-through rate associated with each image from the candidate image dataset is queried and received, by the server, from the web server upon each rendering of the web page, and whereby a first image has a higher dynamic rendering rate than a second image when the first image has a higher click-through rate than the second image; and dynamically updating, by the server, the graphical user interface to display the click-through rate values associated with each image from the candidate image dataset on the electronic client device.

In another embodiment, a method comprises receiving, by a server, from an electronic client device, a request from a client to optimize a GIF media element displayed on a web page using a video file, the request comprising an identification associated with the web page; upon displaying the web page on a graphical user interface on the electronic client device, receiving, by the server, from the electronic client device an indication of an optimization zone within the web page, wherein the optimization zone comprises the GIF media element, and wherein the optimization zone is a portion of the web page; receiving, by the server, a markup code of the web page from a web server hosting the web page; identifying, by the server from the markup code, an initial media element displayed within the optimization zone, the initial media element being configured to be displayed on each rendering of the web page; receiving, by the server, the video file from the electronic client device, the video file comprising a set of video frames where each frame is an image; generating, by the server using the set of video frames, a set of GIF files, each GIF file comprising a predetermined number of consecutive video frames; generating, by the server, a score for each video frame in the set of generated GIF files by analyzing characteristics of images corresponding to each video frame and comparing the characteristics with one or more criteria; determining, by the server, a score for each GIF file by adding the scores of each video frame within the respective GIF file; generating, by the server, a candidate GIF file dataset based on the scores of each generated GIF file by selecting a number of GIF files that satisfy a threshold; iteratively modifying, by the server, the markup code for each rendering of the web page to overlay each GIF file from the candidate GIF file dataset on top of the initial media element within the optimization zone based on a dynamic rendering rate associated with each GIF file within the GIF file dataset, wherein the dynamic rendering rate corresponds to a probability of each GIF file within the candidate GIF file dataset being rendered on the web page, wherein the web page is rendered each time a user accesses the web page, wherein a click-through rate associated with each GIF file from the candidate GIF file dataset is queried and received, by the server, from the web server upon each rendering of the web page, and whereby a first GIF file has a higher dynamic rendering rate than a second GIF file when the first GIF file has a higher click-through rate than the second GIF file; and dynamically updating, by the server, the graphical user interface to display the click-through rate values associated with each GIF file from the candidate GIF file dataset on the electronic client device.

In another embodiment, a method comprises receiving, by a server, from an electronic client device, a request to optimize a GIF lite within a web page using a video, wherein the request comprises an identification associated with the web page; upon displaying the web page on a graphical user interface on the electronic client device, receiving, by the server, from the electronic client device, an optimization zone within the web page, wherein the optimization zone comprises the GIF lite; and wherein the optimization zone is a portion of the web page; receiving, by the server, a markup code of the web page from a web server hosting the web page; identifying, by the server, an initial media element within the optimization zone by determining a partial markup code corresponding to the optimization zone based on coordinates of the optimization zone, wherein the initial media element is configured to be displayed on each rendering of the web page; receiving, by the server, the video from the electronic client device, wherein the video comprises a set of frames with each frame being an image; determining, by the server, a score for each image in the video by analyzing characteristics of the images and comparing the characteristics with one or more criteria; identifying, by the server, a set of GIF lites by selecting a number of images with the highest scores and combining a subset of the images from the selected images; determining, by the server, a score for each GIF lite by adding the scores of images in the GIF lite; generating, by the server, a candidate GIF lite dataset based on the scores of the GIF lites by selecting a number of GIF lites with the highest scores; iteratively modifying, by the server, the markup code for each rendering of the web page to overlay each GIF lite from the candidate GIF lite dataset on top of the initial media element within the optimization zone based on a rendering rate associated with each GIF lite, wherein the dynamic rendering rate corresponds to a probability of each GIF lite within the candidate GIF lite dataset being rendered on the web page, wherein the web page is rendered each time a user accesses the web page, wherein a click-through rate associated with each GIF lite from the candidate GIF lite dataset is queried and received, by the server, from the web server upon each rendering of the web page, and whereby a first GIF lite has a higher dynamic rendering rate than a second GIF lite when the first GIF lite has a higher click-through rate than the second GIF lite; and dynamically updating, by the server, the graphical user interface to display the click-through rate values associated with each GIF lite from the candidate GIF lite dataset on the electronic client device.

In another embodiment, a method comprises receiving, by a server, from an electronic client device, a request to determine and optimize a media element for a web document, the request comprising an identification of a web page configured to direct a user to the web document; receiving, by the server, a markup code of the web page from a web server hosting the web page; receiving, by the server, the web document from the electronic client device; parsing, by the server using natural language processing, content of the web document to extract a set of words; determining, by the server, a score for each word in the web document by analyzing characteristics of each word and comparing the characteristics with one or more pre-determined criteria; generating, by the server, a candidate key word dataset based on the score of the each word by selecting a pre-determined number of words that satisfy a threshold; querying, by the server, a database to receive media elements corresponding to the key words within the key word dataset by comparing captions of each media elements with each candidate key word; determining, by the server, a matching score for each received media element, wherein each matching score is based on a number of key words matching with the caption of the received media element; generating, by the server, a candidate media dataset by selecting a pre-determined number of media elements that satisfying a second threshold; iteratively modifying, by the server, the markup code for each rendering of the web page to overlay each media element from the candidate media dataset based on a dynamic rendering rate associated with each media element, wherein the dynamic rendering rate corresponds to a probability of each media element within the candidate media dataset being rendered on the web page each time the web page is rendered, wherein the web page is rendered each time a user accesses the web page, wherein a click-through rate associated with each media element from the candidate media dataset is queried and received, by the server, from the web server upon each rendering of the web page, wherein the dynamic rendering rate of each media element is dynamically adjusted, by the server, based on the click-through rate of each corresponding media element within the candidate media dataset, and whereby a first media element has a higher dynamic rendering rate than a second media element when the first media element has a higher click-through rate than the second media element; and dynamically updating, by the server, a graphical user interface, displayed on the electronic client device, to display the click-through rate values associated with each media element within the candidate media dataset.

It is to be understood that both the foregoing general description and the following detailed description are exemplary and explanatory and are intended to provide further explanation of the invention as claimed.

BRIEF DESCRIPTION OF THE DRAWINGS

The accompanying drawings constitute a part of this specification and illustrate embodiments of the subject matter disclosed herein.

DETAILED DESCRIPTION

Figure 1:
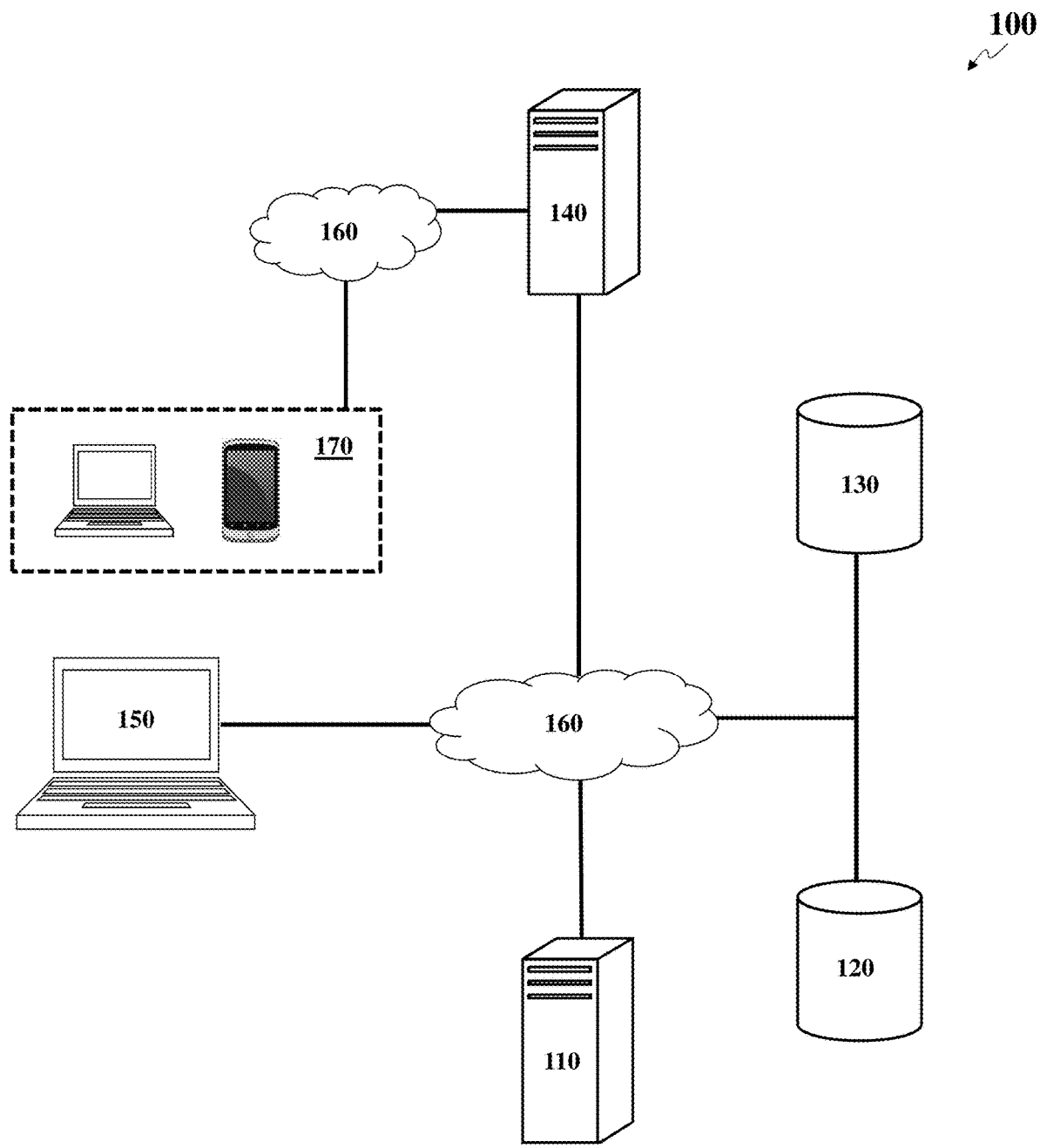
FIG. 1 illustrates a computer system for optimizing a media element within a web page zone, according to an exemplary embodiment.

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one ordinarily skilled in the relevant art and having possession of this disclosure, are to be considered within the scope of the subject matter disclosed herein. The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

FIG. 1 illustrates components of an exemplary system 100 for optimizing a media element within a web page optimization zone, according to an exemplary embodiment. The exemplary system 100 may comprise an analytic server 110, a third party database 120, a content database 130, a web server 140, an electronic client device 150 that are connected with each other via hardware and software components of one or more networks 160. Further, the web server 140 may be connected with a set of electronic devices 170 via the network 160 or another network similar but separate and distinct from the network 160. The web server 140 may display various web pages that include one or more media elements on the electronic devices 170. The web users (operating electronic devices 170) may click the media elements to view the related content using their electronic devices 170. Examples of the network 160 include, but are not limited to, Local Area Network (LAN), Wireless Local Area Network (WLAN), Metropolitan Area Network (MAN), Wide Area Network (WAN), and the Internet. The communication over the network 160 may be performed in accordance with various communication protocols, such as Transmission Control Protocol and Internet Protocol (TCP/IP), User Datagram Protocol (UDP), and IEEE communication protocols.

The electronic client device 150 may be any computing device allowing a participant/client to interact with analytic server 110. One having ordinary skill in the art would also appreciate that the electronic client device 150 may be any computing device comprising a processor and non-transitory machine-readable storage medium allowing the electronic client device 150 to perform the various tasks and processes described herein. The examples of the computing device may include, but are not limited to, a desktop computer, a laptop, a personal digital assistant (PDA), a smartphone, a tablet computer, and the like.

The electronic client device 150 may execute an Internet browser or local application that accesses the analytic server 110 in order to issue requests or instructions. The electronic client device 150 may transmit credentials from client inputs to the analytic server 110, from which the analytic server 110 may authenticate the client and/or determine a client role. One having ordinary skill in the art would appreciate that the electronic client device 150 may comprise any number of input devices configured to receive any number of data inputs, including various types of data inputs allowing for authentication (e.g., username, passwords, certificates, and biometrics).

The electronic client device 150 may be configured to communicate with the analytic server 110 through one or more networks 160, using wired and/or wireless communication capabilities. In operation, the electronic client device 150 may execute a web page optimization program, which may include a graphical user interface (GUI) that renders an interactive layout, schematic, or other elements for the client to input a request. For example, the user interface may include a text-based interface allowing the client to enter manual commands. The request inputted by the client may request the analytic server 110 to optimize media elements within an optimization zone in one or more web pages. For example, the client may be a content provider (e.g., a news agency) that provides different articles and other content on a web page. The web page published by the client (e.g., via server 140 and displayed on electronic devices 170) may include a media element linking the users to an article, a video, any other content provided by the client or a third party. In an embodiment, the client may issue a request to optimize certain portion of the web page (e.g., a portion of the web page containing one or more media elements linking to different contents) to maximize the CTR associated with that web page. In addition, the web page optimization program executed by the analytics server and sometimes on the electronic client device 150, may include a graphical user interface that renders an interactive layout for the client to view the optimization results and metrics and make a selection of media elements based on the results and metrics. The electronic client device 150 may comprise, or may be in networked-communication with a content database 130. For example, the client may provide the contents to be published from a local database. Alternatively, the contents may be stored in a remote database, and the client may provide a link indicating the address of the contents.

The content database 130 may be any non-transitory machine-readable media configured to store data, including data the client may publish on a web page and other related data. For example, the content database 130 may include text, images, slideshows, videos to be published in a web page and/or a dataset of candidates from which the published data can be selected. For example, the client may provide the dataset of candidates stored in the content database 130 and request the analytic server 110 to select a media element from the dataset of candidates to render in the optimization zone. One having ordinary skill in the art would appreciate that the database may include other related data that may be used to optimize the optimization zone in a web page. Alternatively, the client may not provide any candidate media elements, but request the analytic server to search and select an image from a third party database 120 to publish in the optimization zone.

The third party database 120 may be any non-transitory machine-readable media configured to store image data, including images of different topics and captions corresponding to the different images. The analytic server 110 may need to have the authorization to access the third party database 120, so that the analytic server may be able to search images by using keywords. The analytic server 110 may access the third party database 120 via one or more networks 160.

An analytic server 110 may be any computing device comprising a processor and other computing hardware and software components, configured to process the requests received from the electronic client device 150. The analytic server 110 may be logically and physically organized within the same or different devices or structures, and may be distributed across any number of physical structures and locations (e.g., cabinets, rooms, buildings, cities). Upon the analytic serve 110 receiving the request from the electronic client device 150 to optimize a certain optimization zone of a web page hosted by the web server 140, the analytic server 110 may execute one or more component software modules to select one or more media elements either from the candidate dataset provided by the client via the graphical user interface displayed on the client device 150, that is stored in the content database 130, or from a third party database 120. To access the content database 130, the analytic server 150 may generate a graphical user interface to receive authentication. For example, the graphical user interface displayed on the electronic client device 150 may require the client to input a password or login to the content database 130. To access the third party database 120, the analytic server 110 may receive a token from the server that operates the third party database 120. For example, the analytic server 110 may request the cloud to generate the authorization token and then transmit the token to the analytic server 110.

The request from the client may include identification information of a web page that displays the optimization zone. The optimization zone may include a media element (e.g., image, slideshow, video, and the like) to be analyzed and optimized. For example, the client may input the web address or other identification information for a certain web page that contains the media element the client would like to analyze. The web pages are the building blocks of a website hosted by the web server 140.

The web server 140, also called an HTTP server, may be any computing device comprising a process or and other computing hardware and software components, configured to host content, such as a website. A website is a collection of related web pages, including multimedia content, typically identified with a common domain name, and published on at least one web server. Web users operating electronic devices 170 may access the website by referencing a uniform resource locator (URL) that identifies the site. A website may be accessible via one or more networks 160 including a public Internet Protocol (IP) network, such as the Internet, or a private local area network (LAN). The web server 140 may also comprise software that runs on the computing device that retrieves and delivers the web pages in response to requests from the website's users operating electronic devices 170. Web pages are documents, typically composed in plain text interspersed with formatting instructions of Hyper Text Markup Language (HTML, XHTML).

Web pages from one website may incorporate elements from other websites with suitable markup anchors. The web server 140 may transport the web pages with Hypertext Transfer Protocol (HTTP), which may optionally employ encryption (HTTP Secure, HTTPS) to provide security and privacy for the user. Web pages can be viewed or otherwise accessed from a range of computer-based and Internet-enabled electronic devices 170 of various sizes, including desktop computers, laptops, PDAs and cell phones.

The electronic devices 170 may be any computing device allowing a participant/user to interact with web server 140. One having ordinary skill in the art would also appreciate that the electronic devices 170 may be any computing device comprising a processor and non-transitory machine-readable storage medium allowing the electronic devices 170 to interact with a web server 140. The examples of the computing device may include, but are not limited to, a desktop computer, a laptop, a personal digital assistant (PDA), a smartphone, a tablet computer, and the like.

After the analytic server 110 receives the web page identification, the analytic server 110 may further generate a user interface to request the client to determine an optimization zone within the web page. The optimization zone may be a portion of the web page that includes one or more media elements to be optimized. For example, the analytic server 110 may use the identification information received from the client and display the web page in the GUI of the electronic client device 150, and enable the client to pick a portion to be optimized. The client may select the optimization zone by clicking and selecting different corners of the optimization zone.

Furthermore, the analytic server may request the client to provide authentication to download and optimize the media in the optimization zone and query the markup code (e.g., HTML) of the web page from the web server 140. The HTML code may be a dynamic code that changes periodically, because the content of a web page may keep changing. For example, a website may add new stories and videos. The analytic server 110 must know the latest HTML. The analytic server 110 may query the HTML code periodically or monitor the web page constantly to detect new publishing. Alternatively, the web server 140 may notify the analytic server 110 every time a new HTML is generated.

As discussed above, the analytic server 110 may select one or more media elements from either the content database 130 provided by the client or a third party database 120 that the analytic server 110 is authorized to access. In one embodiment, the client may provide a candidate media dataset (e.g., the candidate media elements that the analytic server 110 will display and optimize on the web page) in order to analyze the web users' reactions and study the CTR associated with each media element within the candidate dataset. The analytic server 110 may receive the candidate media elements inputted by the client from the electronic client device 150. For example, the client may upload 10 images or a slideshow comprising a certain number of images and request the analytic server 110 to only analyze those 10 images or the images within the slideshow. The 10 images or slideshow images are thus the candidate media dataset. In another embodiment, the analytic server 110 may select the candidate media dataset from a media element such as a video. For example, the client may upload the video directly into a GUI provided by the analytic server 110. Additionally, or alternatively, the client may input a link directly into the GUI provided by the analytic server 110. The link may provide the address to the video, that may direct the analytic server 110 to the content database 130 to access the video. Additionally or alternatively, the optimization zone may contain hyperlinks indicating a location of the video to be published on the website. For example, when the client indicates the optimization zone, the analytic server 110 may search the markup code (e.g., HTML code), determine the video source/location, and download the video to be optimized. The video may include a large number of frames, and each of them may be an image. The analytic server 110 may select a set of images/frames as the candidate media dataset. In another embodiment, the analytic server 110 may generate the candidate media dataset by selecting media elements from an unconstraint set of media elements. For example, the analytic server 110 may search media elements from a third party database using keywords, and select part of them as the candidate media dataset. One having ordinary skill in the art would appreciate that the candidate media dataset may include image, Graphics Interchange Format (GIF), GIF lite, or other media elements.

After the analytic server 110 generates/retrieves the candidate media dataset, the analytic server 110 may optimize the media elements from the candidate media dataset by displaying them on the optimization zone and gaging the web users' reactions analyze the CTR). Specifically, the analytic server 110 may render each of the candidate media elements based on a rendering rate in the optimization zone of the web page, and monitor the CTR for each media element. The analytic server HO may receive the CTR of different media elements from the web server 140 hosting the website. The analytic server 110 may update the rendering rate of each media element in real time based on the corresponding CTR. So that the media element that is associated with a higher CTR is rendered or published at a higher rate. One having ordinary skill in the art would appreciate that the analytic server may receive other statistical data other than the CTR from the web server 140 to evaluate the performance of different media elements. The optimization process is further described in more details in FIGS. 3A-3C.

Furthermore, the analytic server 110 may display the results and metrics of each media element on a GUI of the electronic client device 150. The analytic server 110 may update the GUI to show the results such as the CTR. In addition, the analytic server 110 may provide different trends and comparison data by obtaining the CTR results before optimization and comparing them to the CTR after optimization. The GUI may also include an interactive interface that allows the client to turn on or turn off a candidate option. In other words, the analytic server 110 may allow the client to edit the candidate media dataset by further selecting media elements that are to be rendered in the optimization zone based on the click-through rates and the client's other consideration. The GUI is further described in more details in FIG. 4.

Figure 2:
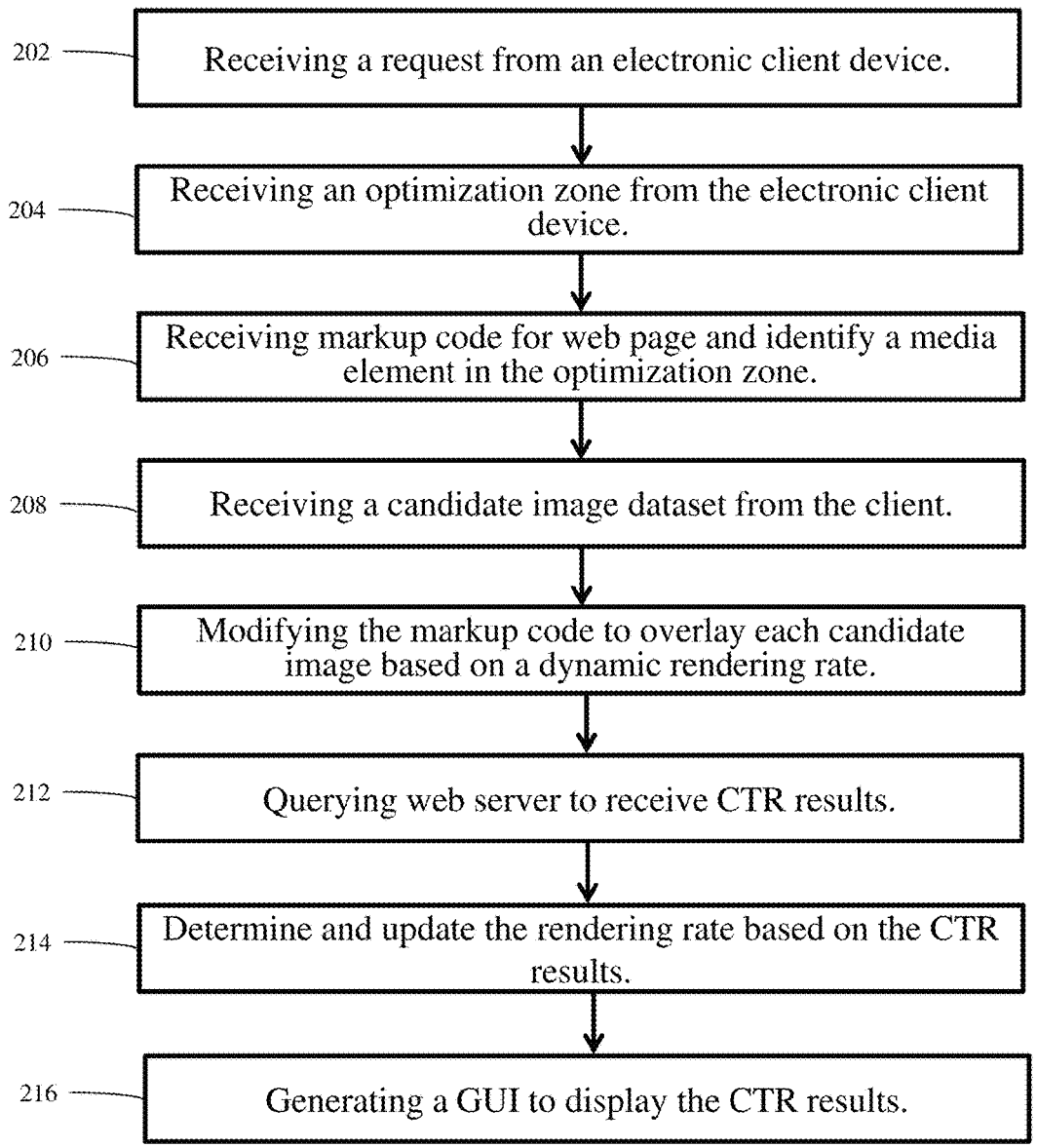
FIG. 2 illustrates a flowchart depicting operational steps for optimizing the click-through rate of an image based on a constraint set of images, according to an exemplary embodiment.

FIG. 2 illustrates execution of an exemplary method 200 for optimizing the click-through rate of an image based on a constraint set of images, according to an exemplary embodiment. One having ordinary skill in the art would appreciate that other embodiments may comprise additional or alternative steps, or may omit some steps altogether.

At step 202, the analytic server may receive a request, from an electronic client device, to optimize one or more images in a web page. In operation, the client may visit a website in an Internet browser or a local application on a mobile device configured to receive requests (e.g., a graphical user interface provided by the analytic server). The client/user may first enter credential information such as username, password, certificate, and biometrics. The electronic client device may transmit the user inputs to the analytic server for authentication. The analytic server may access a system database configured to store user credentials, which the analytic server may be configured to reference in order to determine whether a set of credentials (purportedly authenticating the user) match an appropriate set of credentials that identify and authenticate the user. After the analytic server authenticates the client, the analytic server may generate and serve web pages to the electronic client device of the client. The web pages may include the media element optimization program GUI for the client to input requests. For example, the user interface may include a text-based interface where the client can manually type requests. The user interface may also include selection-based interface such as drop down menus or selection buttons and other graphical components where the client can select different options provided by the analytic server.

The inputted request may include identification information of a web page, which includes the images that the client would like analyze and optimize. For example, the client may input the web address or other identification information of a certain web page in the GUI provided by the analytic server on the electronic client device. Based on the web page identification information, the analytic server may be able to access the web page from a web server.

At step 204, the analytic server may receive an optimization zone from the electronic client device. The web page (identified in step 202) may include different contents from different sources. The client may select an optimization zone that includes various contents and/or media elements (e.g., articles, images, slideshows, videos and the like). Thus, the optimization zone is a portion of the web page that displays the content (e.g., hyperlink directing the web page displaying the content) published by a webserver hosting the website (e.g., web server 140 illustrated in FIG. 1). The analytic server may access the web page based on the identification information and display the web page on an interactive GUI provided on the electronic client device. In an embodiment, the client may interact with the analytic server, use the mouse, and indicate corners of the optimization zone. For example, the client may indicate that the client would like to optimize a portion of a website such as www.123.com. The analytic server may display www.123.com and enable the client to graphically select the optimization zone (e.g., the portion of the www.123.com to be optimized).

At step 206, the analytic server may query and retrieve the markup code (markup language) corresponding to the web page, after proper authentication and authorization, and determine at least one media element within the optimization zone. As disclosed herein, a markup language or markup code is a language or code used for designing and presenting a web page and creating the structure of a website. Markup Languages may include HTML, XML, JavaScript, Java, CSS, Python, and the like. Even though some embodiments disclosed herein are described in the context of HTML code, it is understood that other markup languages may also be used. For example, when a web page is designed via XML code, the analytic server may use XML specific features and code to monitor the web page or dynamically render media elements on the web page.

Because almost all websites are protected from third party modifications, the analytic server may need authorization and need to be authenticated (by a webserver) to have access to the markup code of the web page. The analytic server may request the client to provide login and password associated with the web server. Alternatively, the analytic server may transmit a token to be authenticated by the webserver. One having ordinary skill in the art would appreciate that the analytic server may obtain authorization using any other authentication methods.

When the webserver authenticates the analytic server, the analytic server may receive the markup code (e.g., HTML code) for the web page from the web server, or from a server associated with the client, depending on how the website is hosted. The analytic server may further utilize a partial HTML code corresponding to the optimization zone based on the inputted coordinates of the optimization zone. For example, the analytic server may use the coordinates of the different corners selected by the client (in step 204) to determine the corresponding parts of the HTML code. Based on the identified parts of the HTML code, the analytic server may determine at least one initial media element within the optimization zone. The at least one initial media element may be the thumbnail initially published in the web page, which may be an image, a gif, a gif lite and the like. Thus, the initial media element may be displayed on each rendering of the web page and the rendering rate of the initial media element may be 100%. A 100% rendering rate indicates that the image is rendered every single time that the webpage is rendered. The initial media element may not be the most desirable choice. The analytic server may have the authorization from the web server to modify the HTML code to overlay the initial media element in the optimization zone with other images as described below.

At step 208, the analytic server may receive a candidate image dataset, which is a set of images from the client. For example, the client may upload the set of images through the GUI in the electronic client device. Alternatively, the client may provide a content database address, from which the analytic server may download the set of images. The analytic server may use the images within the set to optimize the media element within the web page's optimization zone by analyzing the CTR associated with each image.

At step 210, the analytic server may modify the markup code (e.g., HTML code) to overlay each of the images from the candidate image dataset based on a dynamic rendering rate. The rendering rate corresponds to a probability of each image within the candidate image dataset being rendered on the web page. The analytic server may determine the rendering rate based on an algorithm that analyzes the effects of the image displayed within the optimization zone (e.g., analyze the CTR when different images are rendered on the web page). The web page is rendered each time a user accesses the web page. The analytic server may render/publish the candidate images (within the candidate image dataset) by overlaying each image on top of the initial media element in the optimization zone.

Initially, the analytic server may have no knowledge regarding the possible CTR produced by each image within the candidate image dataset (e.g., which image within the candidate image dataset will produce the most CTR). Thus the analytic server may randomly select one image to be rendered or render each candidate image at the same rate (e.g., rotating through every image within the candidate image dataset and rendering each image at the same rate). For example, assuming there are 10 images in the candidate image dataset, the analytic server may equally divide the number of renders by giving each image a 10% rate (e.g., rendering each image once before rendering any image for the second time). In other words, each image has a 10% chance of being rendered/published in the optimization zone each time the webpage is rendered. Given a large number of samples (e.g., after the web page has been render for a large or pre-determined number of times, such as after 1000 renderings), the analytic server may render each image within the candidate image dataset at a different rate (e.g., a rate corresponding to their respective CTR). The analytics server may continuously analyze the CTR associated with each image within the candidate image dataset and may dynamically and iteratively modify the display/rendering rates associated with each image based on their respective CTR analysis. This process is further discussed in FIGS. 3B-3C.

At step 212, the analytic server may query the web server hosting the web pages to receive CTR results associated with each image within the candidate image dataset. The analytic server may query the CTR results upon each rending of the web page. Alternatively, the analytic server may query the CTR results periodically (e.g., pre-determined time or based on a time algorithm dependent on the CTR results). For example, the analytic server may query the results every minute or based on a pre-determined time period. The analytics server may dynamically modify the query time period based on the CTR results. For example, the analytic server may query the web server at a higher rate once the CTR for a particular image satisfies a threshold.

The CTR results may indicate a performance of each image within the candidate image dataset. A higher CTR may indicate the corresponding image has a higher probability of being clicked on by users and viewers of the web page. For example, a 4% CTR associated with a particular image may correspond to a 4% chance that any viewer of the website may click on said image and/or may seek to view the content represented by said image.

At step 214, the analytic server may determine and update the rendering rate of each image within the candidate image dataset using an algorithm. The analytic server may maximize the CTR of the optimization zone the images within the optimization zone) while selecting different images to be rendered. The analytic server may perform an "exploration" phase to obtain more information about the CTR of the different images. For example, the analytic server may initially render the images within the candidate image dataset at the same rendering rate, and simultaneously monitor the CTR results of different candidate images. Using various artificial intelligence algorithm and machine learning techniques, the analytic server may dynamically update and adjust its knowledge (e.g., CTR analysis) regarding each candidate image by rendering different images within the candidate image dataset, analyzing the CTR for each image, and updating the knowledge regarding each image in an iterative manner.

The analytic server may iteratively render different images and update the Oa analysis for a pre-determined number of renderings number of the images being rendered, such as exploring and analyzing CTR for 2000 web page views) or a pre-determined time (e.g., amount of time that the web pages with different images are rendered, such as exploring and analyzing CTR for 3 hours). The time and/or the number of renders bounding the exploration phase may be pre-determined or may be inputted by the user.

Based on the knowledge from the exploration phase, the analytic server may optimize the rendering rate by exploiting the image that has the highest payoff (e.g., CTR). For example, the analytic server may render the image that is associated with the highest CTR (based on the analysis performed during the exploration phase) at a higher rate than other images within the candidate image dataset. In other words, the analytic server may dynamically modify or adjust (in real time) the rendering rate of each candidate image based on the corresponding CTR analysis.

After updating the rendering rate, the analytic server may continue monitoring the CTR and further update the rendering rate. In other words, the analytic server may combine the exploration and exploitation phases. The analytics server may render all the images at the same rate initially, and as soon as the analytics server receives the first CTR analysis, the analytics server may modify the rendering rate of each image based on their respective CTR analysis. For example, the analytic server may render an image with a higher CTR at a higher rate. In other words, when a first image has a higher CTR than a second image, the first image may have a higher rendering rate than the second image. The analytic server may iteratively go through the exploration and exploitation phases for a pre-determined period of time, or a pre-determined number of web page views.

In this way, the rendering rate for each image within the dataset is dynamically reconfigured based on viewers CTR. For instance, when viewers (e.g., end users) click on an image at a higher rate, the image will be rendered more often until and unless viewers click on the image at a lower rate where the analytic server reconfigures the rendering rate. This eliminates the need to select one image for content because a website publisher can select multiple images corresponding to the same content and optimize those images based on viewer's choices.

Furthermore, when optimizing images, the analytic server may also use specific web user's preferences in addition to the CTR analysis to update the rendering rates. The analytic server may query cookies (or other web usage indicators) from the web server to learn the users' web browsing history. An HTTP cookie (also called web cookie, Internet cookie, browser cookie, or simple cookie) is a small piece of data sent from the website and stored on the users' computer by the users' web browser while the user is browsing. Utilizing cookies is generally a reliable mechanism for websites to remember state information (such as items added in the shopping cart in an online store) or record the users' browsing activity (including clicking particular button, logging in, or recording which pages were visited in the past). Based on the HTTP cookie, the analytic server may learn the users' preferences and backgrounds. For example, the analytic server may learn that the user is interested in sports, and the analytic server may render images related to sports with a higher rendering rate. The analytic server may determine that the user is interested in sports because a number of web pages from the user's browsing history are associated with www.espn.com. In another embodiment, the analytic server may determine that the user is interested in sports because a number of web pages from the user's browsing history include the word "basketball" more than a pre-determined threshold.

In addition, the analytic server may use the context of the website to modify the rendering rate. For example, when the website to be optimized is a sports related website, the analytic server may render images related to sports at a higher rendering rate. In some embodiments, the context may be inputted or modified by the client. For example, the analytic server may receive new or modified context via the GUI provided on the client computing device. For example, the context of the website or user preferences may be received from the client.

Further, the analytic server may optimize the images based on the users' electronic devices. For example, if the client device is a mobile phone, the analytic server may render large images (and other media elements such as GIFs, GIF lites) with smaller rendering rate out of the consideration of bandwidth. If the client device is a desktop computer, the analytic server may render larger images (and other media elements such as GIFs, GIF lites) with higher rendering rate.

At step 216, the analytic server may generate a graphic user interface on the electronic client device to display the CTR results corresponding to each of the candidate images. Furthermore, the GUI may include the comparison results of the CTR before and after optimization, so that the client may be able to see the performance (e.g., CTR analysis) of different images. The GUI may also include an interactive interface that allows the client to edit the candidate image dataset by turning on or turning off a candidate option. For example, by turning off a candidate option the analytics server may no longer publish that candidate option (e.g., a media element such as an image). The analytic server may dynamically update the CTR results to be displayed on the GUI. For example, whenever the analytic server queries the CTR results from the web server, the analytic server may refresh the GUI with newly received CTR results. The GUI is further described in more details in FIG. 4.

Figure 3A:
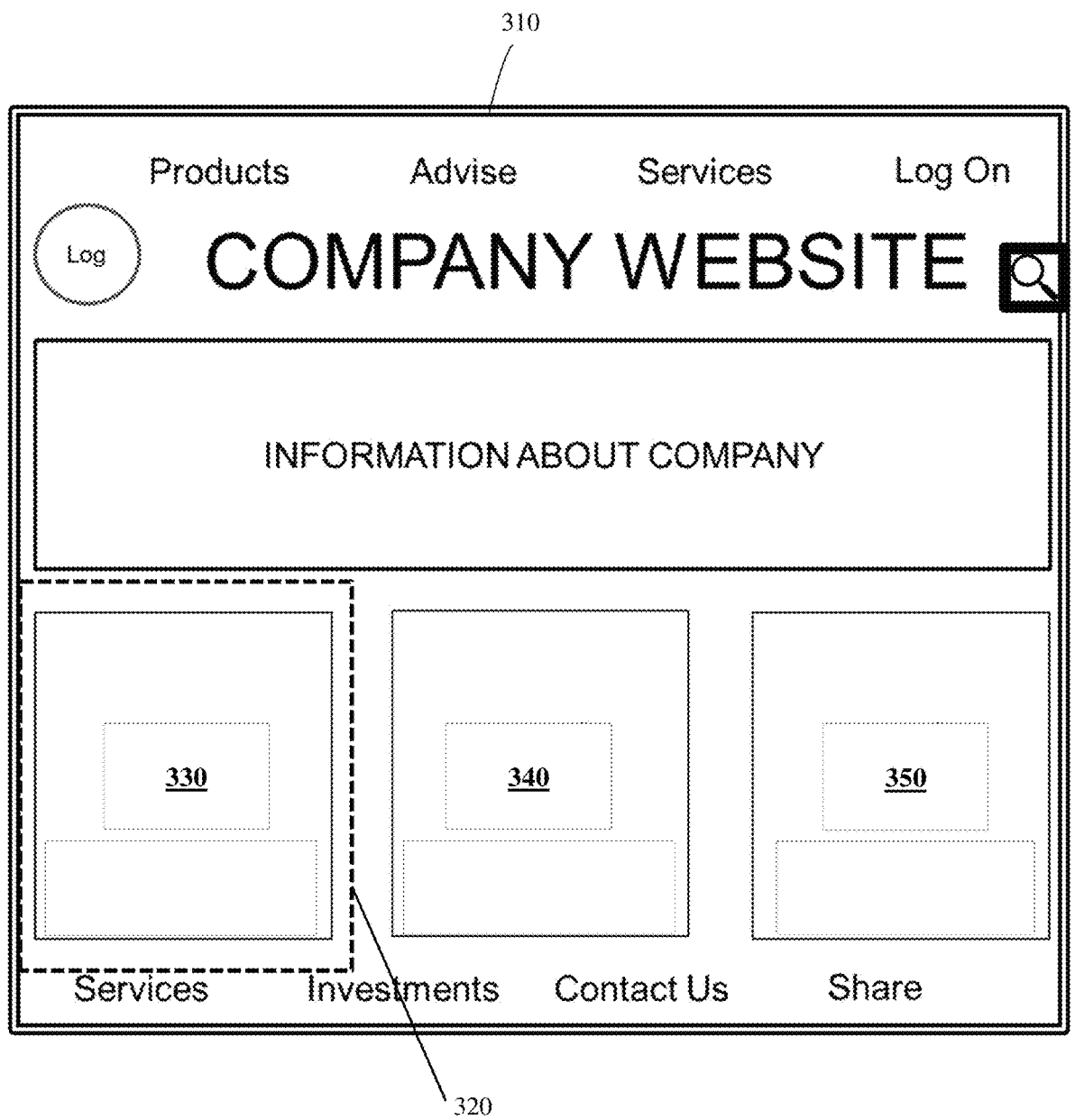
FIG. 3A illustrates an example of an optimization zone in a web page before the click-through rate optimization process, according to an exemplary embodiment.

FIG. 3A illustrates an example of an optimization zone on a web page 310 before the optimization process, according to an exemplary embodiment. The analytic server may access the web page 310 based on the web page identification information received from the client (e.g., the analytics server may receive the identification via the GUI provided on the electronic client device). The web page 310 may include media elements and/or hyperlinks to product information, advice, services, and login interfaces, contact information and other related components. For example, the web page 310 may include media elements 330, 340, 350. Each of the media elements 330, 340, or 350 may be linked to content provided by the website (which includes web page 310). The analytic server may display the web page 310 on the GUI of the electronic client device and request the client to select an optimization zone. The client may select different corners of the optimization zone on the GUI provided by the analytic server. The optimization zone selected by the client may be the portion 320, which include a media element 330. The analytic server may request the authorization to access and modify the HTML code of the web page from the web server. By analyzing the HTML code of the web page 310, the analytic server may identify the corresponding HTML code of the optimization zone 320 based on the coordinates of the different corners selected by the client. The analytic server may further identify the media element 330 within the optimization zone 320 by checking the identified HTML code (e.g., identify the code "img src" or "video" "/video" in HTML code). In an embodiment, web page 310 is the original web page produced by the client and the media element 330 is the initial media element selected by the client or an editor to be published on the web page 310. In the process of optimizing the optimization zone 320, the analytic server may optimize the initial media element 330 by overlaying the media element 330 with other media elements.

Figure 3B:
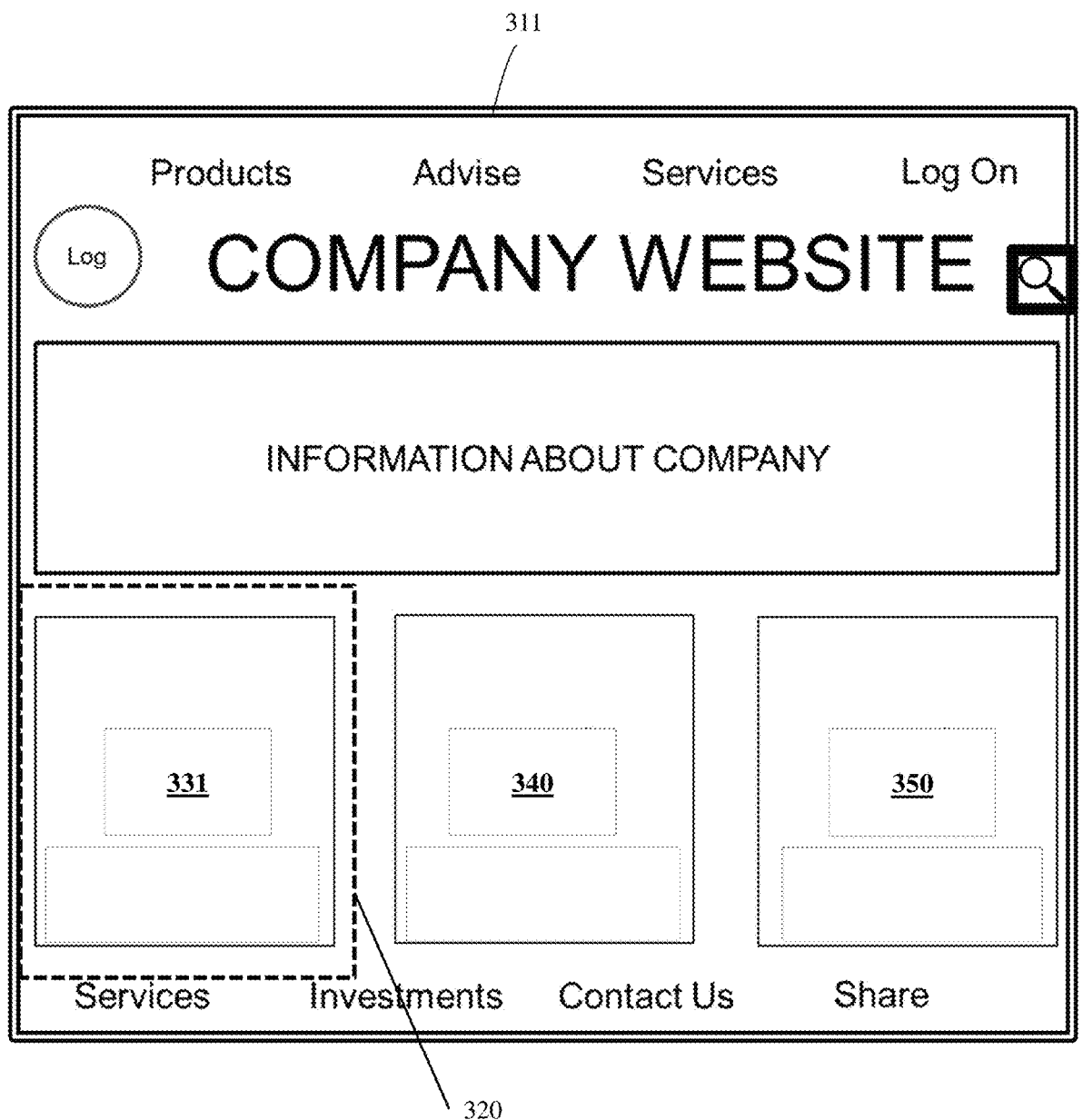
FIGS. 3B-3C illustrate examples of an optimization zone in a web page during the click-through rate optimization process, according to an exemplary embodiment.

FIG. 3B illustrates an example of the optimization zone in the web page 311 during the optimization process. The analytic server may select a media element 331 from the candidate media dataset, and display the media element 331 in the optimization zone by overlaying it on top of the initial media element 330. The analytic server may receive a set of images, a slideshow or a video and determine a candidate media dataset based on images from the slideshow or video. Alternatively, the server may receive an article and determine the candidate media dataset by searching images related with key words in the article. In some embodiments, the analytic server may modify the HTML code associated with the media element 330 and replace the media element 330 with a new media element 331. Thus, the web page 310 may change to web page 311 while the other media elements, such as 340 and 350, remain unchanged. When the web page 310 is refreshed or a new user is viewing the web page 310, the analytics server may modify the web page 310 (by overlaying the media element 330 to media element 331). As a result, the user may view the web page 311 instead. The analytic server may query the web server hosting the web pages 310, 311 to receive statistical data such as CTR on media elements 330, 331. The new media element 331 may be one of the media elements from the candidate media dataset. The analytic server may display other candidate media elements in the optimization zone and query the CTR results.

Figure 3C:
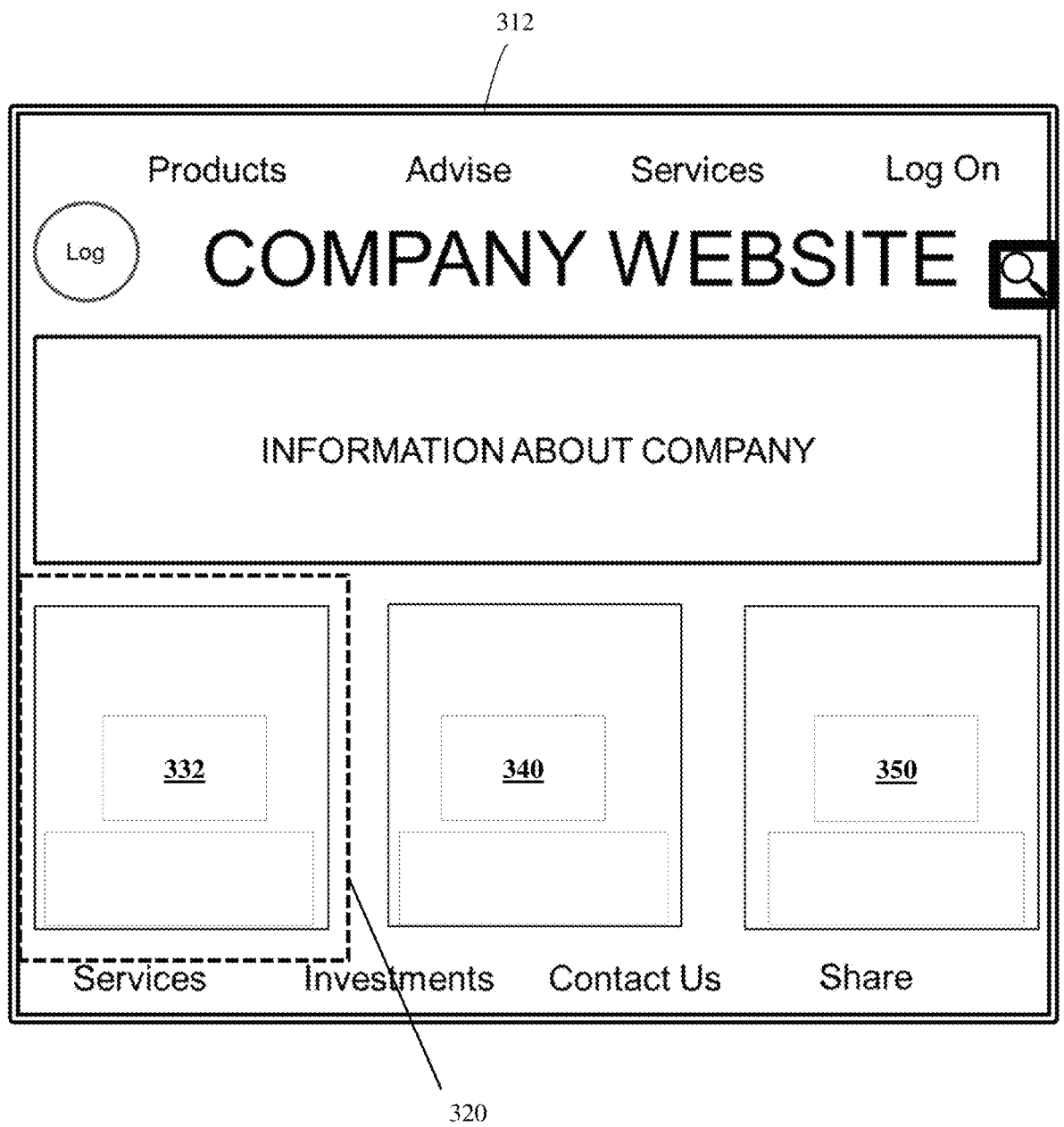

FIG. 3C illustrates an example of the web page 312 with another media element rendered in the optimization zone. In a similar process, the analytic server may select a media element 332 from the candidate media dataset, and display the media element 332 in the optimization zone by overlaying it on top of the initial media element 330. The analytic server may modify the HTML code associated with the media element 330 and replace the media element 331 with a new media element 332. Thus, the web page may change from 311 to 312 with the other media elements such as 340 and 350 unchanged. As a result, the web page 310 may be viewed by a first user, the web page 311 may be viewed by a second user, and the web page 312 may be viewed by a third user. The analytic server may iteratively rotate through all of the candidate media elements with the candidate media dataset and query the web server to receive the statistical CTR results on different media elements based on the optimization algorithms described above in FIG. 2. Based on the CTR results, the analytic server may determine and update the rendering rate using the optimization algorithms introduced in FIG. 2.

Figure 4:
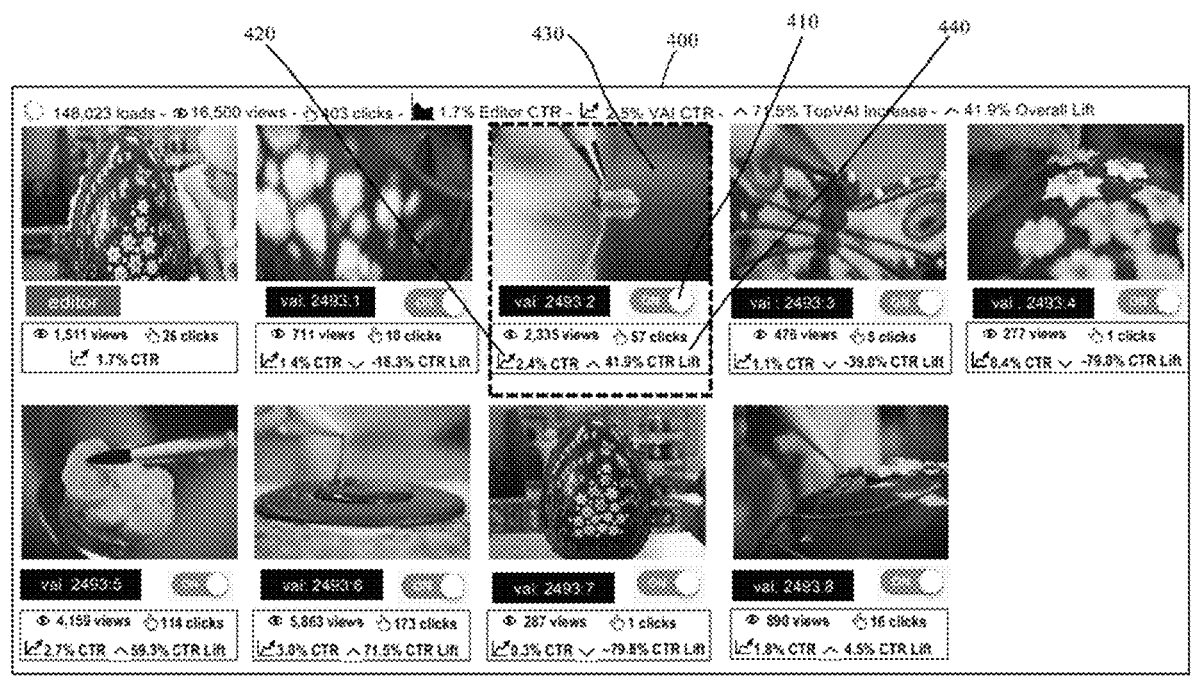
FIG. 4 illustrates an example of a graphical user interface with the click-through rate optimization results, according to an exemplary embodiment.

FIG. 4 illustrates an example of a graphical user interface 400 with optimization results, according to an exemplary embodiment. In the optimization process, the analytic server may render the candidate media elements in the optimization zone and continuously query the web server to receive the statistical results of regarding the optimization zone, such as the CTR and other information. For example, the other information may be how long the web users have stayed on (e.g., viewed) the web page or how many views and hits on the optimization zone of the web page. The analytic server may display the statistical data on the GUI 400 and update the data in real time. As shown in FIG. 4, the GUI 400 may include 9 images with the corresponding statistical results. For example, an image and its statistical results are shown in box 430. The results may include the number of views 2335 for the corresponding image, the number of clicks 57, and the resulting click-through rate (CTR) of 2.4% (e.g., 57/2335=2.4%) 420. In addition, the results may include the comparison results 440 of the CTR before and after optimization. As shown in FIG. 4, the image in 430 brings in a 41.9% CTR lift 440 when comparing to the CTR of the initial media element. The GUI 400 may also include an interactive interface 410 that allows the client to turn on or off a candidate media option. For example, the client may turn off the switch and take the image out of the candidate media dataset. As a result, the analytic serve may not overlay the optimization zone with the images, which the client has turned off.

Figure 5:
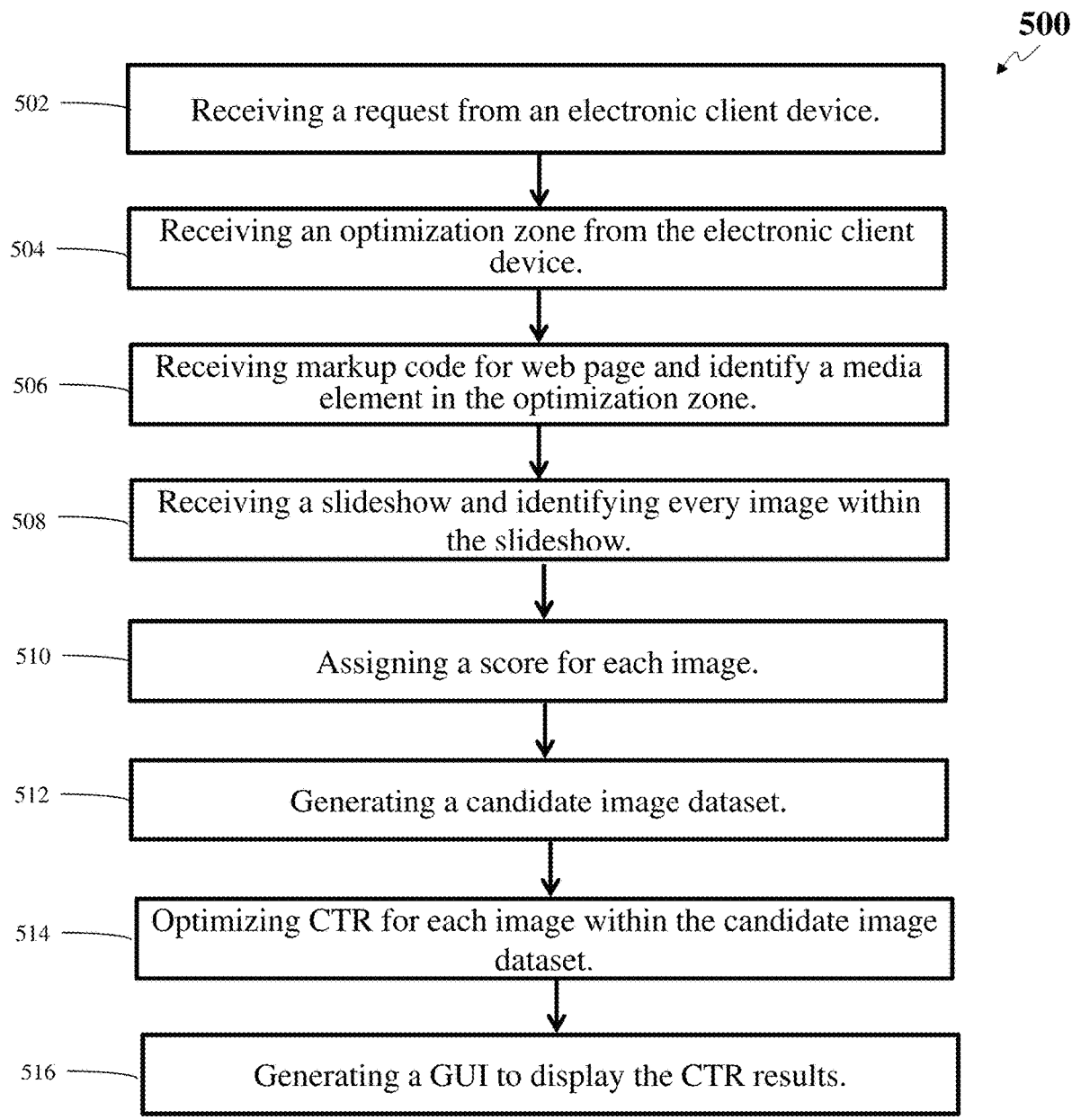
FIG. 5 illustrates a flowchart depicting operational steps for optimizing click-through rate of an image associated with a slideshow, according to an exemplary embodiment.

FIG. 5 illustrates execution of an exemplary method 500 for optimizing CTR of an image based on a slideshow, according to an exemplary embodiment. One having ordinary skill in the art would appreciate that other embodiments may comprise additional or alternative steps, or may omit some steps altogether.

At step 502, the analytic server may receive a request, from an electronic client device, to optimize one or more images from a slideshow within a web page. The client may request the analytic server to optimize and select an image from a slideshow provided by the client. The client may request the analytic server to optimize and select an image from a slideshow provided by the client. For example, the client may have a slideshow to post in a web page. The client may need to determine a thumbnail for the slideshow that can represent the slideshow and produce the most CTR. The client may request the analytic server to select an image from the slideshow to serve as the thumbnail. The client may upload a slideshow through the GUI provided by the analytic server on the electronic client device. Alternatively, the client may provide a link and direct the analytic server to query the slideshow from a separate third party database.

At step 504, the analytic server may receive an optimization zone from the electronic client device. The client may request to publish the video on an optimization zone of a web page. The client may provide the identification information of a web page. For example, the client may input the web address or other identification information of a certain web page in the GUI. Based on the web page identification information, the analytic server may access the web page from a web server. For example, the analytic server may copy the web page identification information e.g., web address) and paste it into a browser address bar to open the web page. The analytic server may display the identified web page in the GUI, where the client may select an optimization zone by indicating corners of the optimization zone. In some embodiments, the optimization zone may include the slideshow to be optimized. For example, the slideshow may be published in the optimization zone of the web page. Instead of uploading the slideshow, the client may indicate the optimization zone of a web page and request the analytic server to optimize the published slideshow in the optimization zone.

At step 506, the analytic server may receive HTML code for the web page via authentication and authorization and determine at least one media element within the optimization zone. The analytic server may further determine a partial HTML code corresponding to the optimization zone based on the inputted coordinates of the optimization zone. For example, the analytic server may use the coordinates of the different corners selected by the client (in step 504) to determine the corresponding partial HTML code. Based on the HTML code received from the web server hosting the website, the analytic server may be able to identify the slideshow within the optimization zone, determine the location of the slideshow and download the slideshow, and determine at least one initial media element within the optimization zone. The at least one initial media element may be the thumbnail initially published in the web page, which may be an image, a GIF, a GIF lite and the like. Thus, the initial media element may be displayed on each rendering of the web page and the rendering rate of the initial media element may be 100%. The initial media element may not be the most desirable choice. The analytic server may have the authorization to overlay the initial media element with other images from the slideshow during the optimization process.

At step 508, the analytic server may receive a slideshow and identify every frame/image within the slideshow. The analytic server may receive the uploaded slideshow directly from the client or download the slideshow from a location (e.g., the address of the slideshow). The slideshow (e.g., PowerPoint file and the like) may include a set of images. The analytic server may identify every image within the slideshow (e.g., every frame within the slideshow). The analytic server may use the images within the slideshow to optimize the medial element within the optimization zone.

At step 510, the analytic server may assign a score for each identified image. The score may reflect how likely the image may be rendered on a web page and produce high CTR. The analytic server may analyze characteristics of each frame/image and assign a score for each frame/image based on the characteristics and pre-determined criteria or other criteria from the client. For example, the analytic server may assign the score based on the darkness of the image, or if there is a celebrity face detected. The analytic server may determine the darkness value of the image by analyzing the image pixels and determine if the darkness value satisfies a threshold. The analytic server may assign a lower score to the images which do not satisfy a darkness threshold. The analytic server may also check if there is a human face detected in the images by running facial recognition algorithms. If a human face or a celebrity face is detected, the corresponding score may be higher.

In some embodiments, the criteria may be inputted or modified by the client. For example, the analytic server may receive new or modified criteria via the GUI provided on the client computing device. For example, the context of the website or user preferences may be received from the client.

In addition, the criteria may include criteria based on web page context. For example, when the website (being viewed by the user) is about sports, the analytic server may assign a relatively high score for images related with sports. The analytic server may determine the context of a web page using natural language detection methods, analyzing the metadata associated with the web page, and/or comparing the name (or the HTTP address) of the web page with a pre-determined list. For example, the analytic server may determine that any web page associated with www.espn.com has a sport-related context. In another embodiment, the analytic server may determine that the context of a web page is sport-related because the word "basketball" is used within a web page more than a pre-determined threshold.

At step 512, the analytic server may generate a candidate image dataset based on a pre-determined number of images. Specifically, the analytic server may select the top N images based on their corresponding scores. Alternatively, the analytic server may select images with scores that satisfy a threshold. The threshold value for the number of selected images N and/or the threshold value for the scores may be a pre-determined value or a value received from the client. For example, the analytic server may receive new or modified threshold value via the GUI provided on the client computing device. In addition, the analytic server may supplement the candidate image dataset with a number of random non-selected images. For example, for each selected image, the analytic server may select three random images out of the slideshow. The purpose of supplementing the candidate dataset with random non-selected images is to ensure that all characteristics are included in the optimization model. Otherwise, low score characteristics may not be available and may not be viewed by the users of the website. As viewers click tendencies and interest trends are constantly changing, an unpredictable event may create a user affinity towards an unsuspecting image (e.g., previously non-selected image with a low score). The analytic server may also use these low-score images as training set to refine its machine learning algorithm and learn about the undesirable images. For example, if an image has an extremely low CTR, the analytic server may tag and index said image and deduce that other similar images (e.g., with similar tags and indexes or satisfying similar thresholds) are also undesirable to the users.

In some embodiments, the analytic server may skip the above step of scoring, selecting, and supplementing images to generate the candidate image dataset. Instead, the analytic server may include every image in the slideshow in the candidate image dataset. For example, the client may request that all the images in the slideshow are included. Alternatively, if the overall number of images in the slideshow is less than a threshold, the analytics server may optimize all the images (e.g., frames) within the slideshow.

After generating the candidate image dataset, the analytic server may further check the images within the candidate image dataset against a set of pre-determined rules. For example, nude images and other violent images (e.g., a catastrophe or an image of a crime being committed) are inappropriate for publishing. As another example, the analytic server may check for copyright issues and take off the infringing images. For example, the analytic server may perform reverse image search to check the source of the images. The analytic server may conduct object recognition on the images and search a certain copyright database to determine the infringing images.

The analytics server may display all the images within the candidate image dataset on the GUI and provide the client the option to select (or deselect) any of the images. The GUI may include an interactive interface for each image that may allow the client to turn off the image option. For example, the interactive interface may be a button associated with each image. If the client does not want an image in the candidate dataset, the client may turn off the button. As a result, the analytic server may remove the image from the candidate dataset, and automatically add another image into the dataset based on the image's score. For example, the analytic server may add the image with the highest score in the non-selected group.

At step 514, the analytic server may optimize the CTR of each image within the candidate image dataset. The analytic server may modify the HTML code to overlay each of the images from the candidate image dataset based on a dynamic rendering rate. The rendering rate corresponds to a probability of each image within the candidate image dataset being rendered on the web page. The analytic server may determine the rendering rate based on an algorithm that analyzes the effects of the image within the optimization zone (e.g., analyze the CTR when different images are rendered on the web page). The web page is rendered each time a user accesses the web page. The analytic server may render/publish the candidate images (within the candidate image dataset) by overlaying each image on top of the initial media element in the optimization zone.

Specifically, the analytic server may initially render the images within the candidate dataset at an equal rate (e.g., with the same rendering rate), and simultaneously monitor the CTR results of different candidate images. The analytic server may query the CTR results upon each rendering of the web page from the web server hosting the web page. Using various artificial intelligence algorithm and machine learning techniques, the analytic server may dynamically update its knowledge (e.g., CTR analysis) regarding each candidate image by rendering different images within the candidate image dataset, analyzing the CTR for each image, and updating the knowledge regarding each image in an iterative manner. The analytic server may dynamically modify or adjust (in real time) the rendering rate of each candidate image based on the corresponding CTR analysis. After updating the rendering rate, the analytic server may continue monitoring, and querying the CTR and further update the rendering rate. The analytics server may render all the images at the same rate initially, and as soon as the analytics server receives the first CTR analysis, the analytics server modifies the rendering rate of each image based on their respective CTR analysis. For example, the analytic server may render an image with a higher CTR at a higher rate. In other words, when a first image has a higher CTR than a second image, the first image may have a higher rendering rate than the second image.

In some embodiments, instead of at the same initial rendering rate, the initial rendering rate of each image may be based on a corresponding score for each image. For example, the image with a higher score may have a larger initial rendering rate. For example, an image with a score of 50 may be rendered with a rendering rate 5 times higher than an image with a score of 10.

At step 516, the analytic server may generate a graphic user interface on the electronic client device to display the CTR results corresponding to each of the candidate images. Furthermore, the GUI may include the comparison results of the CTR before and after optimization, so that the client may be able to see the performance of different images. The GUI may also include an interactive interface that allows the client to edit the candidate image dataset by turning on or turning off a candidate option. The GUI is further described in more details in FIG. 4.

The analytic server may also dynamically update the CTR results in GUI. For example, whenever the analytic server queries the CTR results from the web server, the analytic server may refresh the GUI with newly received CTR results.

Figure 6:
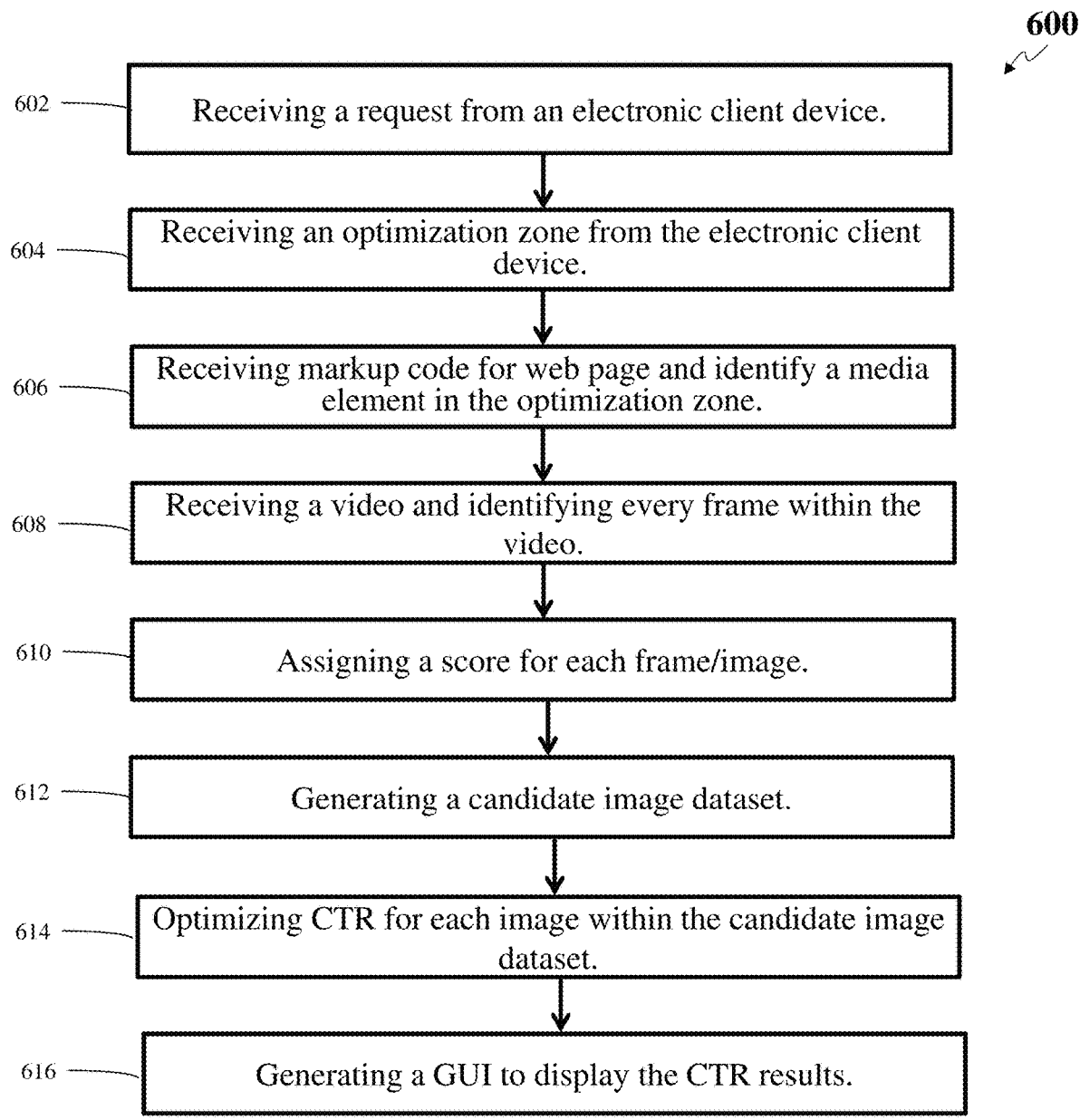
FIG. 6 illustrates a flowchart depicting operational steps for optimizing click-through rate of an image associated with a video, according to an exemplary embodiment.

FIG. 6 illustrates execution of an exemplary method 600 for optimizing click-through rate of an image associated with a video, according to an exemplary embodiment. One having ordinary skill in the art would appreciate that other embodiments may comprise additional or alternative steps, or may omit some steps altogether.

At step 602, the analytic server may receive a request, from an electronic client device, to optimize one or more images from a video. The client may request the analytic server to optimize and select an image from a video provided by the client. For example, the client may have a video to post in a web page. The client may need to determine a thumbnail for the video that can represent the video and produce the most CTR. The client may request the analytic server to select an image from the video to serve as the thumbnail. The client may upload the video through the GUI provided by the analytic server on the electronic client device. Alternatively, the client may direct the analytic server to query the video from a separate database. For example, the video may be a video published in a website such as www.youtube.com, and the client may input a link indicating the location of the video. The analytic server may be able to download the video from the location.

At step 604, the analytic server may receive an optimization zone from the electronic client device. The client may request to publish the video on an optimization zone of a web page. The client may provide the identification information of a web page. For example, the client may input the web address or other identification information of a certain web page in the GUI. Based on the web page identification information, the analytic server may access the web page from a web server. For example, the analytic server may copy the web page identification information e.g., web address) and paste it into a browser address bar to open the web page. The analytic server may display the identified web page in the GUI, where the client may select an optimization zone by indicating corners of the optimization zone. In some embodiments, the optimization zone may include the video to be optimized. For example, the video may be published in the optimization zone of the web page. Instead of uploading the video, the client may indicate the optimization zone of a web page and request the analytic server to optimize the published video in the optimization zone.

At step 606, the analytic server may receive the HTML code for the web page via authentication and authorization, and determine at least one media element within the optimization zone. The analytic server may further determine a partial HTML code corresponding to the optimization zone based on the inputted coordinates of the optimization zone. For example, the analytic server may use the coordinates of the different corners selected by the client (in step 604) to determine the corresponding partial HTML code. Based on the HTML code received from the web server hosting the website, the analytic server may be able to identify the video within the optimization zone, download the video, and determine at least one initial media element within the optimization zone. The at least one initial media element may be the thumbnail initially published in the web page, which may be an image, a GIF, a GIF lite and the like. Thus, the initial media element may be displayed on each rendering of the web page and the rendering rate of the initial media element may be 100%. The initial media element may not be the most desirable choice. The analytic server may have the authorization to overlay the initial media element with other images during the optimization process.

At step 608, the analytic server may receive the video and identify every frame within the video. The analytic server may receive the uploaded video directly from the client or download the video from a location (e.g., the address of the video). The video may include a large number of frames, and each of them may be an image. The video may be made up from a succession of still images. The analytic server may use a variety of methods to extract the frames form the video. The analytic server may identify the images in a video by extracting the frames and saving them to image files automatically, such as jpg or png. The analytic server may use the images from the video to optimize the media element within the web page's optimization zone.

At step 610, the analytic server may assign a score for each identified frame/image. The score may reflect how likely the image may be rendered on a web page and may correspond to a high CTR production. The analytic server may analyze characteristics of each frame/image and assign a score for each frame/image based on the characteristics and pre-determined criteria or other criteria from the client. For example, the analytic server may assign the score based on the darkness of the image, or if there is a celebrity face detected. The analytic server may determine the darkness value of the image by analyzing the image pixels and determining if the darkness value satisfies a threshold. The analytic server may assign a lower score to the images, which do not satisfy a darkness threshold. The analytic server may also check if there is a human face detected in the images by running facial recognition algorithms. If a human face or a celebrity face is detected, the corresponding score may be higher.

In some embodiments, the criteria may be inputted or modified by the client. For example, the analytic server may receive new or modified criteria via the GUI provided on the client computing device. For example, the context of the website or user preferences may be received from the client.

In addition, the criteria may include criteria based on web page context. For example, when the website (being viewed by the user) is a sports website, the analytic server may assign a relatively high score for images related with sports or images that contain faces of sports celebrities. The analytic server may determine the context of a web page using natural language detection methods, analyzing the metadata associated with the web page, and/or comparing the name (or the HTTP address) of the web page with a pre-determined list. For example, the analytic server may determine that any web page associated with www.espn.com has a sport-related context. In another embodiment, the analytic server may determine that the context of a web page is sport-related because the word "basketball" is used within a web page more than a pre-determined threshold.

At step 612, the analytic server may generate a candidate image dataset based on a pre-determined threshold or a predetermined number. Specifically, the analytic server may select the top N images based on their corresponding scores. Alternatively, the analytic server may select images with scores that satisfy a threshold. The threshold value for the number of selected images N and/or the threshold value for the scores may be a pre-determined value or a value received from the client. For example, the analytic server may receive new or modified threshold value via the GUI provided on the client computing device. In addition, the analytic server may supplement the candidate image dataset with a number of random non-selected images. For example, for each selected image, the analytic server may select three random images out of the video frames to ensure that all characteristics are included in the optimization model. Otherwise, low score characteristics may not be available and may not be viewed by the users of the website. As viewers click tendencies and interest trends are constantly changing, an unpredictable event may create a user affinity towards an unsuspecting image (e.g., previously non-selected image with a low score). The analytic server may also use these low-score images as training set to refine its machine learning algorithm and learn about the undesirable images. For example, if an image has an extremely low CTR, the analytic server may tag and index said image and deduce that other similar images (e.g., with similar tags and indexes or satisfying similar thresholds) are also undesirable to the users.

In addition, the analytic server may eliminate similar images/frames that are sequential or substantially similar. Specifically, the analytic server may analyze the image pixels and compute a similarity value between two images' pixels. If the similarity value satisfies a threshold, the analytic server may determine that the two images are substantially similar.

Furthermore, the analytic server may include every frame in the video in the candidate image dataset. For example, the client may request that all the images/frames in the video are included. Alternatively, if the overall number of images/frames in the video is less than a threshold, the analytics server may optimize all the images (e.g., frames) within the video.

After generating the candidate image dataset, the analytic server may further check the images within the candidate image dataset against a set of pre-determined rules. For example, nude images and other violent images (e.g., a catastrophe or an image of a crime being committed) are inappropriate for publishing. As another example, the analytic server may check for copyright issues and take off the infringing images. For example, the analytic server may perform reverse image search to check the source of the images. The analytic server may conduct object recognition on the images and search a certain copyright database to determine the infringing images.

The analytics server may display all the images within the candidate image dataset on the GUI and provide the client the option to select (or deselect) any of the images. The GUI may include an interactive interface for each image that may allow the client to turn off the image option. For example, the interactive interface may be a button associated with each image. If the client does not want an image in the candidate dataset, the client may turn off the button. As a result, the analytic server may remove the image from the candidate dataset, and automatically add another image into the dataset based on the image's score. For example, the analytic server may add the image with the highest score in the non-selected group.

At step 614, the analytic server may optimize the CTR of each image within the candidate image dataset. The analytic server may modify the markup code to overlay each of the images from the candidate image dataset based on a dynamic rendering rate. The rendering rate corresponds to a probability of each image within the candidate image dataset being rendered on the web page. The analytic server may determine the rendering rate based on an algorithm that analyzes the effects of the image within the optimization zone (e.g., analyze the CTR when different images are rendered on the web page). The web page is rendered each time a user accesses the web page. The analytic server may render/publish the candidate images (within the candidate image dataset) by overlaying each image on top of the initial media element in the optimization zone.

Specifically, the analytic server may initially render the images within the candidate dataset at the same rate (e.g., with the same rendering rate), and simultaneously monitor the CTR results of different candidate images. The analytic server may query the CTR results upon each rendering of the web page from the web server hosting the web page. Using various Artificial intelligence algorithm and machine learning techniques, the analytic server may dynamically update its knowledge (e.g., CTR analysis) regarding each candidate image by rendering different images within the candidate image dataset, analyzing the CTR for each image, and updating the knowledge regarding each image in an iterative manner. The analytic server may dynamically modify or adjust (in real time) the rendering rate of each candidate image based on the corresponding CTR analysis. After updating the rendering rate, the analytic server may continue monitoring and querying the CTR and further update the rendering rate. The analytics server may render all the images at the same rate initially, and as soon as the analytics server receives the first CTR analysis, the analytics server modifies the rendering rate of each image based on their respective CTR analysis. For example, the analytic server may render an image with a higher CTR at a higher rate. In other words, when a first image has a higher CTR than a second image, the first image may have a higher rendering rate than the second image.

In some embodiments, instead of the same initial rendering rate, the initial rendering rate of each image may be based on a corresponding score for each image. The image with a higher score may have a higher initial rendering rate. For example, an image with a score of 50 may be rendered with a rendering rate 5 times higher than an image with a score of 10.

At step 616, the analytic server may generate a graphic user interface on the electronic client device to display the CTR results corresponding to each of the candidate images. Furthermore, the GUI may include the comparison results of the CTR before and after optimization, so that the client may be able to see the performance of different images. The GUI may also include an interactive interface that allows the client to edit the candidate image dataset by turning on or turning off a candidate option. The GUI is further described in more details in FIG. 4.

The analytic server may also dynamically update the CTR results in GUI. For example, whenever the analytic server queries the CTR results from the web server, the analytic server may refresh the GUI with newly received CTR results.

Figure 7:
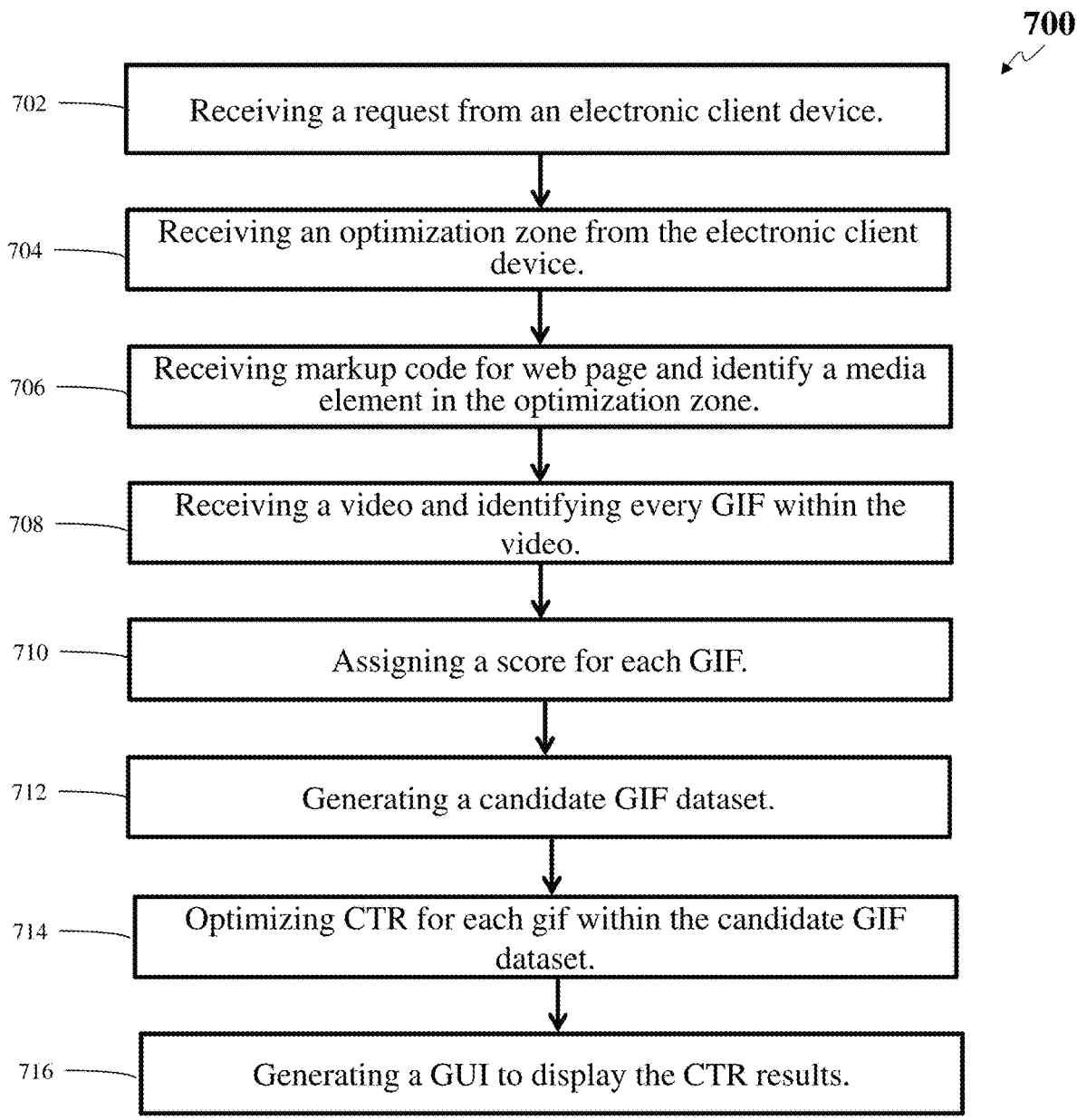
FIG. 7 illustrates a flowchart depicting operational steps for optimizing click-through rate of a GIF associated with a video, according to an exemplary embodiment.

FIG. 7 illustrates execution of an exemplary method 700 for optimizing click-through rate of a GIF associated with a video, according to an exemplary embodiment. One having ordinary skill in the art would appreciate that other embodiments may comprise additional or alternative steps, or may omit some steps altogether.

At step 702, the analytic server may receive a request, from an electronic client device, to optimize one or more GIFs from a video. The client may request the analytic server to optimize and select a GIF from a video provided by the client. For example, the client may have a video to post in a web page. The client may need to determine a thumbnail for the video that can represent the video and produce the most CTR. The client may request the analytic server to select a GIF from the video to serve as the thumbnail. The client may upload a video through the GUI provided by the analytic server on the electronic client device. Alternatively, the client may direct the analytic server to query the video from a separate database. For example, the video may be a video published in www.youtube.com and the client may input a link indicating the location of the video. The analytic server may be able to download the video from the location.

At step 704, the analytic server may receive an optimization zone from the electronic client device. The client may request to publish the video on an optimization zone of a web page. The client may provide the identification information of a web page. For example, the client may input the web address or other identification information of a certain web page in the GUI. Based on the web page identification information, the analytic server may access the web page from a web server. For example, the analytic server may copy the web page identification information (e.g., web address) and paste it into a browser address bar to open the web page. The analytic server may display the identified web page in the GUI, where the client may select an optimization zone by indicating corners of the optimization zone. In some embodiments, the optimization zone may include the video to be optimized. For example, the video may be published in the optimization zone of the web page. Instead of uploading the video, the client may indicate the optimization zone of a web page and request the analytic server to optimize the published video in the optimization zone.

At step 706, the analytic server may receive HTML code for the web page via authentication and authorization, and determine at least one media element within the optimization zone. The analytic server may further determine a partial HTML code corresponding to the optimization zone based on the inputted coordinates of the optimization zone. For example, the analytic server may use the coordinates of the different corners selected by the client (in step 704) to determine the corresponding partial HTML code. Based on the HTML code received from the web server hosting the website, the analytic server may be able to identify the video within the optimization zone, download the video, and determine at least one initial media element within the optimization zone. The at least one initial media element may be the thumbnail initially published in the web page, which may be an image, a GIF, a GIF lite and the like. The initial media element may not be the most desirable choice. Thus, the initial media element may be displayed on each rendering of the web page and the rendering rate of the initial media element may be 100%. The analytic server may have the authorization to overlay the initial media element with other GIFs during the optimization process.

At step 708, the analytic server may receive the video and identify every GIF within the video. The analytic server may receive the uploaded video directly from the client or download the video from a location (e.g., the address of the video). The video may be a succession of still images, with each individual image being a frame. The video may include a large number of frames. A GIF may be a certain number of consecutive frames in the video. The analytic server may identify a set of GIFs based on a number of frames. For example, a first GIF may be frame 1 to frame 100; a second GIF may be frame 2 to frame 101. The number of frames may be a pre-determined value. Alternatively, the client may determine the number through GUI provided by the analytic server.

At step 710, the analytic server may assign a score for each GIF. The score may reflect how likely the GIF may be rendered on a web page and produce high CTR. The score for each GIF may be the sum value of scores of each frame/image in the GIF. The analytic server may analyze characteristics of each frame/image and assign a score for each frame/image based on the characteristics and pre-determined criteria or other criteria from the client. For example, the analytic server may assign the score based on the darkness of the image, or if there is a celebrity face detected. The analytic server may determine the darkness value of the GIFs by analyzing the frame pixels and determine if the darkness value satisfies a threshold. The analytic server assign a lower score to the GIFs which do not satisfy a darkness threshold. The analytic server may also check if there is a human face detected in the frames by running facial recognition algorithms. If a human face or a celebrity face is detected, the corresponding score may be higher.

In some embodiments, the criteria may be inputted or modified by the client. For example, the analytic server may receive new or modified criteria via the GUI provided on the client computing device. For example, the context of the website or user preferences may be received from the client.

In addition, the criteria may include criteria based on web page context. For example, when the website (being viewed by the user) is about sports, the analytic server may assign a relatively high score for images related with sports. The analytic server may determine the context of a web page using natural language detection methods, analyzing the metadata associated with the web page, and/or comparing the name (or the HTTP address) of the web page with a pre-determined list. For example, the analytic server may determine that any web page associated with www.espn.com has a sport-related context. In another embodiment, the analytic server may determine that the context of a web page is sport-related because the word "basketball" is used within a web page more than a pre-determined threshold.

Furthermore, the analytic server may determine if there is any changes in the background pixels. If the background pixels of the frames in a GIF are the same, the analytic server may assign a higher score to the GIF. The same background pixels are more desirable because they provide continuity in the GIF.

At step 712, the analytic server may generate a candidate GIF dataset based on a pre-determined number. Specifically, the analytic server may select the top N GIFs based on their corresponding scores. Alternatively, the analytic server may select GIFs with scores that satisfy a threshold. The threshold value for the number of selected GIFs N and/or the threshold value for the scores may be a pre-determined value or a value received from the client. For example, the analytic server may receive new or modified threshold value via the GUI provided on the client computing device. In addition, the analytic server may supplement the candidate GIF dataset with a number of random non-selected GIFs. For example, for each selected GIF, the analytic server may select three random GIFs out of the video frames to ensure that all characteristics are included in the optimization model. Otherwise, low score characteristics may not be available and may not be viewed by the users of the website. As viewers click tendencies and interest trends are constantly changing, an unpredictable event may create a user affinity towards an unsuspecting GIF (e.g., previously non-selected GIF with a low score). The analytic server may also use these low-score GIFs as training set to refine its machine learning algorithm and learn about the undesirable GIFs. For example, if a GIF has an extremely low CTR, the analytic server may tag and index said GIF and deduce that other similar GIFs (e.g., with similar tags and indexes or satisfying similar thresholds) are also undesirable to the users.

In addition, the analytic server may eliminate similar GIFs that are sequential or substantially similar. Specifically, the analytic server may analyze the image pixels of frames/images within two GIFs and compute a similarity value between two GIFs' pixels. If the similarity value satisfies a threshold, the analytic server may determine that the two GIFs are substantially similar.

Furthermore, the analytic server may include every GIF in the video in the candidate GIF dataset. For example, the client may request that all the GIFs in the video are included. Alternatively, if the overall number of GIFs in the video is less than a threshold, the analytics server may optimize all the GIFs within the video.

After generating the candidate GIF dataset, the analytic server may further check the GIFs within the candidate GIF dataset against a set of pre-determined rules. For example, nude images and other violent images (e.g., a catastrophe or an image of a crime being committed) are inappropriate for publishing. As another example, the analytic server may check for copyright issues and take off the GIFs including infringing images. For example, the analytic server may perform reverse image search to check the source of the images. The analytic server may conduct object recognition on the images and search a certain copyright database to determine the infringing images.

The analytics server may display all the GIFs within the candidate GIF dataset on the GUI and provide the client the option to select (or deselect) any of the GIFs The GUI may include an interactive interface for each GIF that may allow the client to turn off the GIF option. For example, the interactive interface may be a button associated with each GIF. If the client does not want a GIF in the candidate dataset, the client may turn off the button. As a result, the analytic server may remove the GIF from the candidate dataset, and automatically add another GIF into the dataset based on the GIF's matching score. For example, the analytic server may add the GIF with the highest score in the non-selected group.

At step 714, the analytic server may optimize the CTR of each GIF within the candidate GIF dataset. The analytic server may modify the HTML code to overlay each of the GIFs from the candidate GIF dataset based on a dynamic rendering rate. The rendering rate corresponds to a probability of each GIF within the candidate GIF dataset being rendered on the web page. The analytic server may determine the rendering rate based on an algorithm that analyzes the effects of the GIF within the optimization zone (e.g., analyze the CTR when different GIFs are rendered on the web page). The web page is rendered each time a user accesses the web page. The analytic server may render/publish the candidate GIFs (within the candidate GIF dataset) by overlaying each GIF on top of the initial media element in the optimization zone.

Specifically, the analytic server may initially render the GIFs within the candidate dataset at an equal rate (e.g., with the same rendering raterendering rate), and simultaneously monitor the CTR results of different candidate GIFs. The analytic server may query the CTR results upon each rendering of the web page from the web server hosting the web page. Using various artificial intelligence algorithm and machine learning techniques, the analytic server may dynamically update its knowledge (e.g., CTR analysis) regarding each candidate GIF by rendering different GIFs within the candidate GIF dataset, analyzing the CTR for each GIF, and updating the knowledge regarding each GIF in an iterative manner. The analytic server may dynamically modify or adjust (in real time) the rendering rate of each candidate GIF based on the corresponding CTR analysis. After updating the rendering rate, the analytic server may continue monitoring and querying the CTR and further update the rendering rate. The analytics server may render all the GIFs at the same rate initially, and as soon as the analytics server receives the first CTR analysis, the analytics server modifies the rendering rate of each GIF based on their respective CTR analysis. For example, the analytic server may render a GIF with a higher CTR at a higher rate. In other words, when a first GIF has a higher CTR than a second GIF the first GIF may have a higher rendering rate than the second GIF.

In some embodiments, instead of the same initial rendering rate, the initial rendering rate of each GIF may be based on a corresponding score for each image. The GIF with a higher score may have a higher initial rendering rate. For example, a GIF with a score of 50 may be published with a rendering rate 5 times higher than a GIF with a score of 10.

At step 716, the analytic server may generate a graphic user interface on the electronic client device to display the CTR results corresponding to each of the candidate GIFs. Furthermore, the GUI may include the comparison results of the CTR before and after optimization, so that the client may be able to see the performance of different GIFs. The GUI may also include an interactive interface that allows the client to edit the candidate GIF dataset by turning on or turning off a candidate option. The GUI is further described in more details in FIG. 4.

The analytic server may also dynamically update the CTR results in GUI. For example, whenever the analytic server queries the CTR results from the web server, the analytic server may refresh the GUI with newly received CTR results.

Figure 8:
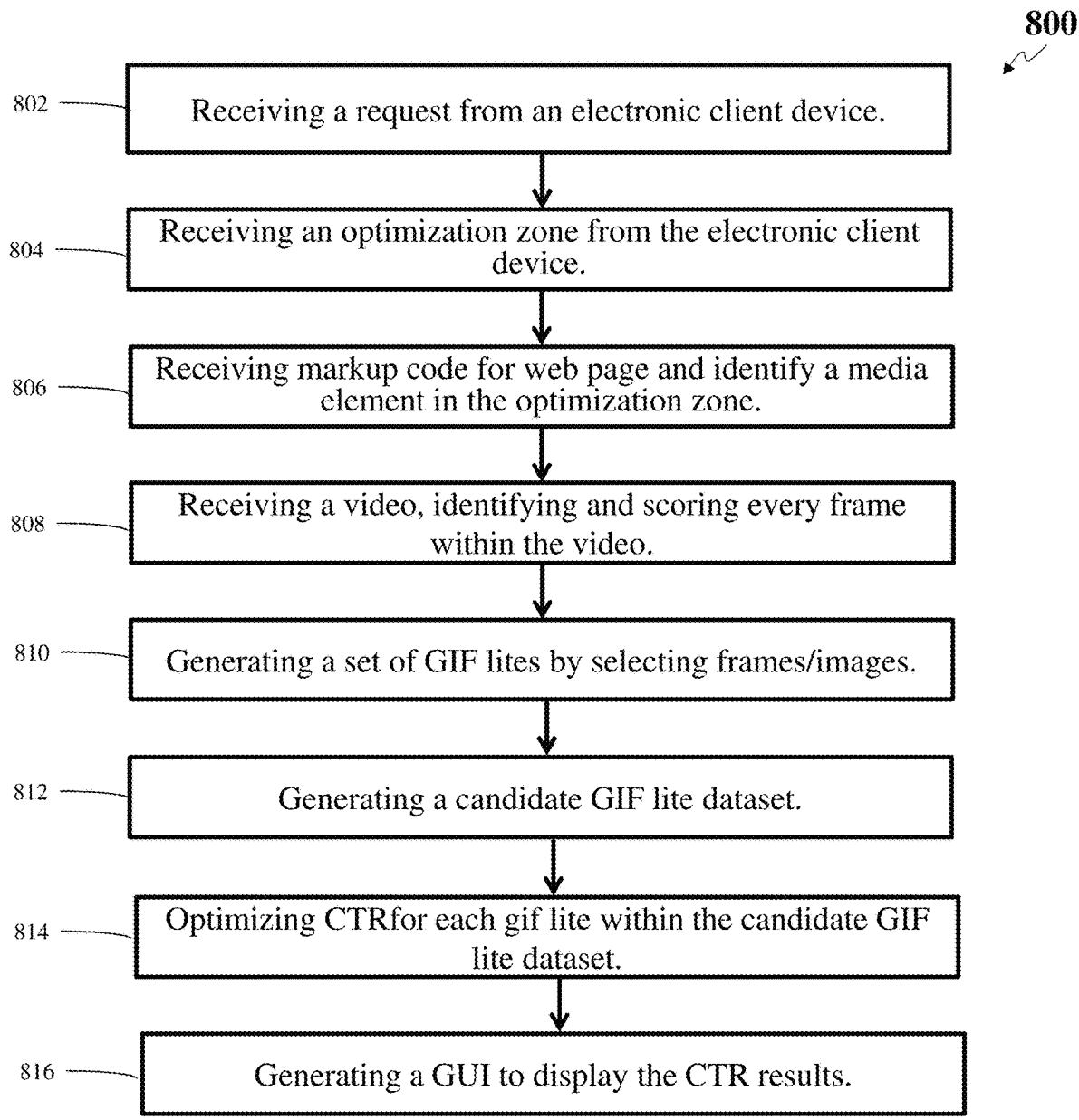
FIG. 8 illustrates a flowchart depicting operational steps for optimizing click-through rate of a GIF lite associated with a video, according to an exemplary embodiment.

FIG. 8 illustrates execution of an exemplary method 800 for optimizing click-through rate of a GIF lite associated with a video, according to an exemplary embodiment. One having ordinary skill in the art would appreciate that other embodiments may comprise additional or alternative steps, or may omit some steps altogether.

At step 802, the analytic server may receive a request, from an electronic client device, to optimize one or more GIF lites from a video. The client may request the analytic server to optimize and select a GIF lite from a video provided by the client. For example, the client may have a video to post in a web page. The client may need to determine a thumbnail for the video that can represent the video and produce the most CTR. The client may request the analytic server to select a GIF lite from the video to serve as the thumbnail. The client may upload a video through the GUI provided by the analytic server on the electronic client device. Alternatively, the client may direct the analytic server to query the video from a separate database. For example, the video may be a video published in www.youtube.com and the client may input a link indicating the location of the video. The analytic server may be able to download the video from the location.

At step 804, the analytic server may receive an optimization zone from the electronic client device. The client may request to publish the video on an optimization zone of a web page. The client may provide the identification information of a web page. For example, the client may input the web address or other identification information of a certain web page in the GUI. Based on the web page identification information, the analytic server may access the web page from a web server. For example, the analytic server may copy the web page identification information (e.g., web address) and paste it into a browser address bar to open the web page. The analytic server may display the identified web page in the GUI, where the client may select an optimization zone by indicating corners of the optimization zone. In some embodiments, the optimization zone may include the video to be optimized. For example, the video may be published in the optimization zone of the web page. Instead of uploading the video, the client may indicate the optimization zone of a web page and request the analytic server to optimize the published video in the optimization zone.

At step 806, the analytic server may receive HTML code for the web page via authentication and authorization, and determine at least one media element within the optimization zone. The analytic server may further determine a partial HTML code corresponding to the optimization zone based on the inputted coordinates of the optimization zone. For example, the analytic server may use the coordinates of the different corners selected by the client (in step 804) to determine the corresponding partial HTML code. Based on the HTML code received from the web server hosting the website, the analytic server may be able to identify the video within the optimization zone, download the video, and determine at least one initial media element within the optimization zone. The at least one initial media element may be the thumbnail initially published in the web page, which may be an image, a GIF, a GIF lite and the like. Thus, the initial media element may be displayed on each rendering of the web page and the rendering rate of the initial media element may be 100%. The initial media element may not be the most desirable choice. The analytic server may have the authorization to overlay the initial media element with other GIF lites during the optimization process.

At step 808, the analytic server may receive the video, identify and score every frame within the video. The analytic server may receive the uploaded video directly from the client or download the video from a location (e.g., the address of the video). The video may be a succession of still images, with each individual image being a frame. The video may include a large number of frames. Each frame is an image. A GIF lite may be a certain number of inconsecutive frames/images in the video. The analytic server may assign a score for each frame using the scoring algorithms. Specifically, the analytic server may analyze characteristics of each frame/image and assign a score for each frame/image based on the characteristics and pre-determined criteria or other criteria from the client. For example, the analytic server may assign the score based on the darkness of the image, or if there is a celebrity face detected. The analytic server may determine the darkness value of the GIF lites by analyzing the frame pixels and determine if the darkness value satisfies a threshold. The analytic server assign a lower score to the GIF lites which do not satisfy a darkness threshold. The analytic server may also check if there is a human face detected in the frames by running facial recognition algorithms. If a human face or a celebrity face is detected, the corresponding score may be higher.

In some embodiments, the criteria may be inputted or modified by the client. For example, the analytic server may receive new or modified criteria via the GUI provided on the client computing device. For example, the context of the website or user preferences may be received from the client.

In addition, the criteria may include criteria based on web page context. For example, when the website (being viewed by the user) is about sports, the analytic server may assign a relatively high score for images related with sports. The analytic server may determine the context of a web page using natural language detection methods, analyzing the metadata associated with the web page, and/or comparing the name (or the HTTP address) of the web page with a pre-determined list. For example, the analytic server may determine that any web page associated with www.espn.com has a sport-related context. In another embodiment, the analytic server may determine that the context of a web page is sport-related because the word "basketball" is used within a web page more than a pre-determined threshold.

At step 810, the analytic server may generate a set of GIF lites. Based on the score of each frame/image, the analytic server may select a certain number of frames/images. For example, the analytic server may select top N frames from the video. The number of selected frames may be pre-determined or user determined.

Each GIF lite may include M fames. The number of frames M included in a GIF lite may be a pre-determined or user determined value. For example, each GIF lite may include 5 non-consecutive frames (e.g., M=5). The analytic server may randomly select M frames from the N highest scored frames to generate a set of GIF lites. As a result, there may be C(N, M) possible combinations of frames (e.g., GIF lites). Each GIF lite may have a score equal to the sum of each frame's score.

At step 812, the analytic server may generate a candidate GIF lite dataset based on a pre-determined number. Specifically, the analytic server may select the top N GIF lites based on their corresponding scores. Alternatively, the analytic server may select GIF lites with scores that satisfy a threshold. The threshold value for the number of selected GIF lites N and/or the threshold value for the scores may be a pre-determined value or a value received from the client. For example, the analytic server may receive new or modified threshold value via the GUI provided on the client computing device. In addition, the analytic server may supplement the candidate GIF lite dataset with a number of random non-selected GIF lites. For example, for each selected GIF lite, the analytic server may select three random GIF lites out of the video frames to ensure that all characteristics are included in the optimization model. Otherwise, low score characteristics may not be available and may not be viewed by the users of the website. As viewers click tendencies and interest trends are constantly changing, an unpredictable event may create a user affinity towards an unsuspecting GIF lite (e.g., previously non-selected GIF lite with a low score). The analytic server may also use these low-score GIF lites as training set to refine its machine learning algorithm and learn about the undesirable GIF lites. For example, if a GIF lite has an extremely low CTR, the analytic server may tag and index said GIF lite and deduce that other similar GIF lites (e.g., with similar tags and indexes or satisfying similar thresholds) are also undesirable to the users.

Furthermore, the analytic server may include every GIF lite in the video in the candidate GIF lite dataset. For example, the client may request that all the GIF lites in the video are included. Alternatively, if the overall number of GIF lites in the video is less than a threshold, the analytics server may optimize all the GIF lites within the video.

After generating the candidate GIF lite dataset, the analytic server may further check the GIF lites within the candidate GIF lite dataset against a set of pre-determined rules. For example, nude images and other violent images (e.g., a catastrophe or an image of a crime being committed) are inappropriate for publishing. As another example, the analytic server may check for copyright issues and take off the GIF lites including infringing images. For example, the analytic server may perform reverse image search to check the source of the images. The analytic server may conduct object recognition on the images and search a certain copyright database to determine the infringing images.

The analytics server may display all the GIF lites within the candidate GIF lite dataset on the GUI and provide the client the option to select (or deselect) any of the GIF lites. The GUI may include an interactive interface for each GIF lite that may allow the client to turn off the GIF lite option. For example, the interactive interface may be a button associated with each GIF lite. If the client does not want a GIF lite in the candidate dataset, the client may turn off the button. As a result, the analytic server may remove the GIF lite from the candidate dataset, and automatically add another GIF lite into the dataset based on the GIF lite's score. For example, the analytic server may add the GIF lite with the highest score in the non-selected group.

At step 814, the analytic server may optimize the CTR of each GIF lite within the candidate GIF lite dataset. The analytic server may modify the HTML code to overlay each of the GIF lites from the candidate GIF lite dataset based on a dynamic rendering rate. The rendering rate corresponds to a probability of each GIF lite within the candidate GIF lite dataset being rendered on the web page. The analytic server may determine the rendering rate based on an algorithm that analyzes the effects of the GIF lite within the optimization zone (e.g., analyze the CTR when different GIF lites are rendered on the web page). The web page is rendered each time a user accesses the web page. The analytic server may render/publish the candidate GIF lites (within the candidate GIF lite dataset) by overlaying each GIF lite on top of the initial media element in the optimization zone.

Specifically, the analytic server may initially render the GIF lites within the candidate dataset at an equal rate (e.g., with the same rendering rate), and simultaneously monitor the CTR results of different candidate GIF lites. The analytic server may query the CTR results upon each rendering of the web page from the web server hosting the web page. Using various artificial intelligence algorithm and machine learning techniques, the analytic server may dynamically update its knowledge (e.g., CTR analysis) regarding each candidate GIF lite by rendering different GIF lites within the candidate GIF lite dataset, analyzing the CTR for each GIF lite, and updating the knowledge regarding each GIF lite in an iterative manner. The analytic server may dynamically modify or adjust (in real time) the rendering rate of each candidate GIF lite based on the corresponding CTR analysis. After updating the rendering rate, the analytic server may continue monitoring and querying the CTR and further update the rendering rate. The analytics server may render all the GIF lites at the same rate initially, and as soon as the analytics server receives the first CTR analysis, the analytics server modifies the rendering rate of each GIF lite based on their respective CTR analysis. For example, the analytic server may render a GIF lite with a higher CTR at a higher rate. In other words, when a first GIF lite has a higher CTR than a second GIF lite, the first GIF lite may have a higher rendering rate than the second GIF lite.

In some embodiments, instead of the same initial rendering rate, the initial rendering rate of each GIF lite may be based on a corresponding score for each GIF lite. For example, the GIF lite with a higher score may have a higher initial rendering rate. For example, a GIF lite with a score of 50 may be rendered with a rendering rate 5 times higher than a GIF lite with a score of 10.

At step 816, the analytic server may generate a graphic user interface on the electronic client device to display the CTR results corresponding to each of the candidate GIF lites. Furthermore, the GUI may include the comparison results of the CTR before and after optimization, so that the client may be able to see the performance of different GIF lites. The GUI may also include an interactive interface that allows the client to edit the candidate GIF lite dataset by turning on or turning off a candidate option. The GUI is further described in more details in FIG. 4.

The analytic server may also dynamically update the CTR results in GUI. For example, whenever the analytic server queries the CTR results from the web server, the analytic server may refresh the GUI with newly received CTR results.

Figure 9:
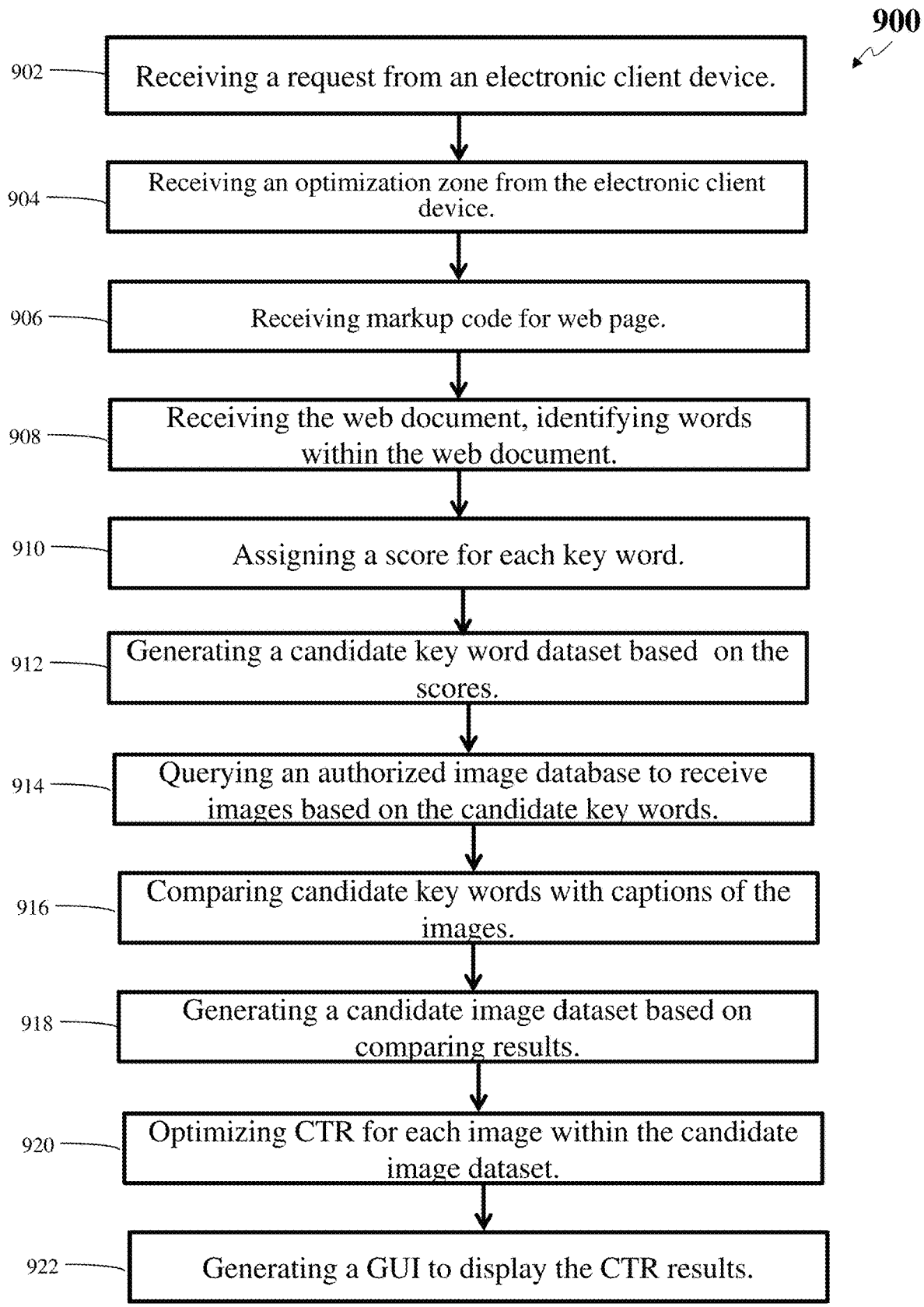
FIG. 9 illustrates a flowchart depicting operational steps for selecting and optimizing the click-through rate of an image based on an unconstraint set of images, according to an exemplary embodiment.

FIG. 9 illustrates execution of an exemplary method 900 for optimizing the click-through rate of an image based on an unconstraint set of images, according to an exemplary embodiment. One having ordinary skill in the art would appreciate that other embodiments may comprise additional or alternative steps, or may omit some steps altogether.

At step 902, the analytic server may receive a request, from an electronic client device, to optimize one or more images within a web page for an article. The inputted request may include identification information of a certain web page in the GUI provided by the analytic server. Based on the identification information, the analytic server may access the web page from a web server. For example, the analytic server may copy the web page identification information (e.g., web address) and paste it into a browser address bar to open the web page. The client may request the analytic server to optimize the thumbnail of an article. For example, the client may have an article to post in a web page. The client may need to determine a thumbnail for the article that can represent the article and produce the most CTR. The client may request the analytic server to search and find an image to serve as the thumbnail. The client may upload the article through the GUI. Alternatively, the client may provide a link and direct the analytic server to query the article from a separate third party database.

At step 904, the analytic server may receive an optimization zone from the electronic client device. The analytic server may access the web page (identified in step 902) based on the identification information and display the web page on an interactive GUI provided on the electronic client device. The client may select the optimization zone by indicating the corners of the optimization zone.

At step 906, the analytic server may receive the HTML code for the web page after proper authentication and authorization. The analytic server may further determine a partial HTML code corresponding to the optimization zone based on the inputted coordinates of the optimization zone. For example, the analytic server may use the coordinates of the different corners selected by the client (in step 904) to determine the corresponding partial HTML code.

At step 908, the analytic server may receive the article and perform natural language processing to identify a set of key words within the article. The analytic server may receive the article directly from the client or download the article from a location (e.g., the address of the article). The article may include a large number of key words. The analytic server may analyze the article by natural language processing. The analytic server may identify a set of key words by parsing the words in the article. Specifically, the analytic server may recognize words associated with people, places, events, entities and the like. One having ordinary skill in the art would also appreciate that the analytic server may receive other web documents.

At step 910, the analytic server may assign a score for each identified key word. The analytic server may analyze the characteristics of the key words and assign a score for each identified key words based on the characteristics and pre-determined criteria or other criteria from the client. For example, key words in the title may have higher scores. Key words associated with people may have high scores. Key words associated with famous people may have higher scores than non-famous people. If no person identified, key words associated with entities may have higher scores. In some embodiments, the criteria may be inputted or modified by the client. For example, the analytic server may receive new or modified criteria via the GUI provided on the client computing device. For example, the context of the website or user preferences may be received from the client.

In addition, the criteria may include criteria based on web page context. For example, when the analytic server determines the context of the web page (to be optimized) to be a sport related web page, the analytic server may assign a relatively higher score for identified key words related with sports. The analytics server may also modify the scoring algorithm described in step 910 based on the context of the web page displayed. For example, as explained above, the analytic server may assign a higher score to the key word associated with famous persons. If the analytics server detects more than one famous persons within the article, the analytic server may assign a higher score to the famous person who is more likely associated with the context of the web page. For example, if the analytic server detects that the article contains "Kobe Bryant" and Jack Nicholson," and if the analytic server determines that the article is to be published (or to be optimized) on a sport-related website, the analytic server may assign a higher score to the key word of "Kobe Bryant."

The analytic server may determine the context of a web page using natural language detection methods, analyzing the metadata associated with the web page, and/or comparing the name (or the HTTP address) of the web page with a pre-determined list. For example, the analytic server may determine that any web page associated with www.espn.com has a sport-related context. In another embodiment, the analytic server may determine that the context of a web page is sport-related because the word "basketball" is used within a web page more than a pre-determined threshold.

In addition, the analytic server may employ n-gram to score keywords/terms. An n-gram model is a type of probabilistic language model for predicting the next item in such a sequence in the form of a (n–1) order Markov model. In the fields of computational linguistics and probability, an n-gram is a contiguous sequence of n items from a given sample of text or speech. The items can be phonemes, syllables, letters, words or base pairs according to the application. The n-grams typically are collected from a text or speech corpus. In some embodiments, the analytic server may create a vector for each word extracted from the web document based on the word's corresponding n-gram value. The analytic server may also score the words based on their corresponding vectors.

At step 912, the analytic server may generate a candidate key word dataset based on a pre-determined number of key words. Specifically, the analytic server may select the top N key words based on their corresponding scores. Alternatively, the analytic server may select key words with scores that satisfy a threshold. The threshold value for the number of selected key words N and/or the threshold value for the scores may be a pre-determined value or a value received from the client. For example, the analytic server may receive new or modified threshold value via the GUI provided on the client computing device. In some configurations, the analytic server may rank the keywords and select the highly ranked keywords (e.g., top 25%, or other predetermined values).

In addition, the analytic server may supplement the candidate key word dataset with a number of random non-selected key words. For example, for each selected key word, the analytic server may select three random key words out of the identified words in the article to ensure that all characteristics are included in the optimization model. Otherwise, low score characteristics may not be available and may not be viewed by the users of the website. As viewers click tendencies and interest trends are constantly changing, an unpredictable event may create a user affinity towards an unsuspecting key word (e.g., previously non-selected key word with a low score). The analytic server may also use these low-score key words as training set to refine its machine learning algorithm and learn about the undesirable key words. For example, if a key word has an extremely low CTR, the analytic server may tag and index said key word and deduce that other similar key words (e.g., with similar tags and indexes or satisfying similar thresholds) are also undesirable to the users.

Furthermore, the analytic server may include every key word in the article in the candidate key word dataset. For example, the client may request that all the key words in the article are included. Alternatively, if the overall number of key words in the article is less than a threshold, the analytics server may optimize all the key words within the article.

At step 914, the analytic server may query an authorized image database to receive images based on the candidate key words. To access the image database, the analytic server may generate a graphical user interface to receive authentication. For example, the graphical user interface displayed on the electronic client device may require the client to input a password or login to the image database. To access the image database, the analytic server may receive a token from the server that operates the image database. For example, the analytic server may request the cloud to generate the authorization token and then transmit the token to the analytic server. After proper authorization, the analytic server may query the database through key words searching. The inputted key words are key words within the candidate key word dataset. The analytic server may receive images related to the inputted key words from the database. The analytic server may also receive captions associated with the received images.

At step 916, the analytic server may compare the candidate key words with a caption associated with each received image. The caption may include descriptions of the corresponding image, such as the subject matter, related people, events, entities or other key words associated with the image. The analytic server may perform string-matching algorithms to compare the candidate key words with the caption of each image. The results may be the number of the matching key words. Alternatively, the results may be the matching score that is the sum value of the matching key words' scores (identified in step 910). For example, assuming the caption of an image has three key words that march the candidate key words. The scores of the matching key words are 30, 18, 12. Thus, the matching score may be 60.

At step 918, the analytic server may generate a candidate image dataset based on the matching results of the key words and the captions. In some embodiments, the analytic server may select the images based on the number of matching key words. Specifically, the analytic server may select the top N images based on their corresponding matching words. For example, the analytic server may select the top 10 images with the most number of matching key words. Alternatively, the analytic server may select images with the number of matching key words satisfy a threshold. For example, the analytic server may select the images that have at least 3 matching key words. In some other embodiments, the analytic server may select the images based on the matching score (e.g., the sum of the scores of the matching key words). For example, the analytic server may select the top 10 images with the highest matching scores. As another example, the analytic server may select the images whose matching score is higher than 50. The analytic server may use the images within the candidate image dataset to optimize the article in the optimization zone.

After generating the candidate image dataset, the analytic server may further check the images within the candidate image dataset against a set of pre-determined rules. For example, nude images and other violent images (e.g., a catastrophe or an image of a crime being committed) are inappropriate for publishing. As another example, the analytic server may check for copyright issues and take off the infringing images. For example, the analytic server may perform reverse image search to check the source of the images. The analytic server may conduct object recognition on the images and search a certain copyright database to determine the infringing images.

The analytics server may display all the images within the candidate image dataset on the GUI and provide the client the option to select (or deselect) any of the images. The GUI may include an interactive interface for each image that may allow the client to turn off the image option. For example, the interactive interface may be a button associated with each image. If the client does not want an image in the candidate dataset, the client may turn off the button. As a result, the analytic server may remove the image from the candidate dataset, and automatically add another image into the dataset based on the image's matching score. For example, the analytic server may add the image with the highest matching score in the non-selected group.

At step 920, the analytic server may optimize the CTR of each image within the candidate image dataset. The analytic server may modify the HTML code to overlay each of the images from the candidate image dataset based on a dynamic rendering rate. The rendering rate corresponds to a probability of each image within the candidate image dataset being rendered on the web page. The analytic server may determine the rendering rate based on an algorithm that analyzes the effects of the image within the optimization zone (e.g., analyze the CTR when different images are rendered on the web page). The web page is rendered each time a user accesses the web page. The analytic server may render/publish the candidate images (within the candidate image dataset) by overlaying each image on top of the initial media element in the optimization zone.

Specifically, the analytic server may initially render the images within the candidate dataset at an equal rate (e.g., with the same rendering rate), and simultaneously monitor the CTR results of different candidate images. The analytic server may query the CTR results upon each rendering of the web page from the web server hosting the web page. Using various artificial intelligence algorithm and machine learning techniques, the analytic server may dynamically update its knowledge (e.g., CTR analysis) regarding each candidate image by rendering different images within the candidate image dataset, analyzing the CTR for each image, and updating the knowledge regarding each image in an iterative manner. The analytic server may dynamically modify or adjust (in real time) the rendering rate of each candidate image based on the corresponding CTR analysis. After updating the rendering rate, the analytic server may continue monitoring and querying the CTR and further update the rendering rate. The analytics server may render all the images at the same rate initially, and as soon as the analytics server receives the first CTR analysis, the analytics server modifies the rendering rate of each image based on their respective CTR analysis. For example, the analytic server may render an image with a higher CTR at a higher rate. In other words, when a first image has a higher CTR than a second image, the first image may have a higher rendering rate than the second image.

In some embodiments, instead of the same initial rendering rate, the initial rendering rate of each image may be based on a corresponding matching result for each image. For example, the image with more matching key words may have a larger initial rendering rate. For example, an image whose caption has 6 matching key words may be rendered with a rendering rate 2 times larger than an image whose caption has 3 matching key words.

At step 922, the analytic server may generate a graphic user interface on the electronic client device to display the CTR results corresponding to each of the candidate images. Furthermore, the GUI may include the comparison results of the CTR before and after optimization, so that the client may be able to see the performance of different images. The GUI may also include an interactive interface that allows the client to edit the candidate image dataset by turning on or turning off a candidate option. The GUI is further described in more details in FIG. 4.

The analytic server may also dynamically update the CTR results in GUI. For example, whenever the analytic server queries the CTR results from the web server, the analytic server may refresh the GUI with newly received CTR results.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the generic principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A computer-implemented method comprising:
   receiving, by a server from an electronic client device, a request to optimize an image within a web page using images from a video file, wherein the request comprises an identification associated with the web page;
   upon displaying the web page on a graphical user interface on the electronic client device, receiving, by the server, from the electronic client device, an indication of an optimization zone within the web page, wherein the optimization zone is configured to display the image to be optimized, and wherein the optimization zone is a portion of the web page;
   receiving, by the server, markup code of the web page from a web server hosting the web page;
   identifying, by the server from the markup code, an initial media element displayed within the optimization zone, the initial media element being configured to be displayed with each rendering of the web page;
   receiving, by the server, the video file from the electronic client device, the video file comprising a set of video frames where each frame is an image;
   determining, by the server, a score for each image corresponding to each frame of the video file by analyzing characteristics of each image and comparing the characteristics with one or more predetermined criteria;
   generating, by the server, a candidate image dataset by selecting a number of images that satisfy a score threshold;
   iteratively modifying, by the server, the markup code for each rendering of the web page to overlay each image from the candidate image dataset on top of the initial media element within the optimization zone based on a dynamic rendering rate associated with each image, wherein the dynamic rendering rate corresponds to a probability of each image within the candidate image dataset being rendered on the web page each time the web page is rendered, wherein the web page is rendered each time a user accesses the web page, wherein a click-through rate associated with each image from the candidate image dataset is queried and received, by the server from the web server, upon each rendering of the web page, and whereby a first image has a higher dynamic rendering rate than a second image when the first image has a higher click-through rate than the second image; and
   dynamically updating, by the server, the graphical user interface to display the click-through rate associated with each image from the candidate image dataset on the electronic client device.

2. The method of claim 1, wherein an initial rendering rate of each image within the candidate image dataset is the same.

3. The method of claim 1, wherein the server uses context of the web page to adjust the dynamic rendering rate of each image within the candidate image dataset.

4. The method of claim 1, wherein the server uses user preferences received from an electronic device operated by the user accessing the web page to adjust the dynamic rendering rate of each image within the candidate image dataset.

5. The method of claim 4, wherein the server uses cookies to identify the user preferences.

6. The method of claim 1, wherein the graphical user interface displays an option for the electronic client device to modify the candidate image dataset.

7. The method of claim 1, wherein the graphical user interface further displays a click-through rate trend associated with each image within the candidate image dataset.

8. A computer-implemented method comprising:
   receiving, by a server from an electronic client device, a request from a client to optimize a GIF media element displayed on a web page using a video file, the request comprising an identification associated with the web page;
   upon displaying the web page on a graphical user interface on the electronic client device, receiving, by the server, from the electronic client device an indication of an optimization zone within the web page, wherein the optimization zone comprises the GIF media element, and wherein the optimization zone is a portion of the web page;
   receiving, by the server, a markup code of the web page from a web server hosting the web page;
   identifying, by the server from the markup code, an initial media element displayed within the optimization zone, the initial media element being configured to be displayed with each rendering of the web page;
   receiving, by the server, the video file from the electronic client device, the video file comprising a set of video frames where each frame is an image;

generating, by the server using the set of video frames, a set of GIF files, each GIF file comprising a predetermined number of consecutive video frames;

generating, by the server, a score for each video frame within each GIF file in the set of generated GIF files by analyzing characteristics of images within each GIF file and comparing the characteristics with one or more predetermined criteria;

determining, by the server, a score for each GIF file by adding the score of each video frame within the respective GIF files;

generating, by the server, a candidate GIF file dataset by selecting a number of GIF files that satisfy a threshold;

iteratively modifying, by the server, the markup code for each rendering of the web page to overlay each GIF file from the candidate GIF file dataset on top of the initial media element within the optimization zone based on a dynamic rendering rate associated with each GIF file within the candidate GIF file dataset, wherein the dynamic rendering rate corresponds to a probability of each GIF file within the candidate GIF file dataset being rendered on the web page, wherein the web page is rendered each time a user accesses the web page, wherein a click-through rate associated with each GIF file from the candidate GIF file dataset is queried and received, by the server, from the web server upon each rendering of the web page, and whereby a first GIF file has a higher dynamic rendering rate than a second GIF file when the first GIF file has a higher click-through rate than the second GIF file; and dynamically updating, by the server, the graphical user interface to display the click-through rate associated with each GIF file from the candidate GIF file dataset on the electronic client device.

9. The method of claim 8, wherein an initial rendering rate of each GIF within the candidate GIF file dataset is the same.

10. The method of claim 8, wherein the server uses context of the web page to adjust the dynamic rendering rate of each GIF within the candidate GIF file dataset.

11. The method of claim 8, wherein the server uses user preferences received from an electronic device operated by the user accessing the web page to adjust the dynamic rendering rate of each GIF within the candidate GIF file dataset.

12. The method of claim 11, wherein the server uses cookies to identify the user preferences.

13. The method of claim 8, wherein the graphical user interface displays an option for the electronic client device to modify the candidate GIF file dataset.

14. The method of claim 8, wherein the graphical user interface further displays a click-through rate trend associated with each GIF within the candidate GIF file dataset.

* * * * *